US012511235B2

United States Patent
Chujo et al.

(10) Patent No.: US 12,511,235 B2
(45) Date of Patent: Dec. 30, 2025

(54) STORAGE APPARATUS AND CONTROL METHOD FOR STORAGE APPARATUS

(71) Applicant: Hitachi Vantara, Ltd., Yokohama (JP)

(72) Inventors: Norio Chujo, Tokyo (JP); Masanori Takada, Tokyo (JP)

(73) Assignee: HITACHI VANTARA, LTD., Kanagawa (JP)

( * ) Notice: Subject to any disclaimer, the term of this patent is extended or adjusted under 35 U.S.C. 154(b) by 0 days.

(21) Appl. No.: 18/882,315

(22) Filed: Sep. 11, 2024

(65) Prior Publication Data

US 2025/0231876 A1    Jul. 17, 2025

(30) Foreign Application Priority Data

Jan. 16, 2024   (JP) .................. 2024-004679

(51) Int. Cl.
*G06F 12/0806* (2016.01)
*G06F 12/0868* (2016.01)

(52) U.S. Cl.
CPC ...... *G06F 12/0806* (2013.01); *G06F 12/0868* (2013.01); *G06F 2212/1032* (2013.01)

(58) Field of Classification Search
CPC ......... G06F 12/0806; G06F 2212/1032; G06F 12/0868
USPC ................................................ 711/119, 162
See application file for complete search history.

(56) References Cited

U.S. PATENT DOCUMENTS

| 2013/0031307 | A1* | 1/2013 | Itoh ....................... G06F 3/0689 |
| | | | 711/E12.019 |
| 2015/0324289 | A1 | 11/2015 | Mo | |
| 2016/0259571 | A1* | 9/2016 | Kumasawa ........... G06F 3/0619 |
| 2024/0427713 | A1* | 12/2024 | Chujo ................. G06F 13/1663 |

FOREIGN PATENT DOCUMENTS

JP    2016-513316 A    5/2016

* cited by examiner

*Primary Examiner* — Hashem Farrokh
(74) *Attorney, Agent, or Firm* — Volpe Koenig

(57) ABSTRACT

A storage apparatus includes a first control device having a first memory, a second control device having a second memory, and a memory module having a third memory. The first memory and the second memory store drive control information including association between a logical address and a physical address, cache data in data I/O processing, and cache control information including association between a logical address of the cache data and a cache address of the cache data. The third memory stores the drive control information, dirty data of the cache data in the first memory, dirty data of the cache data in the second memory, and the cache control information. Even in a case where the control device or the memory module is blocked, the dirty data is set to be redundantly stored in each of different apparatuses.

15 Claims, 16 Drawing Sheets

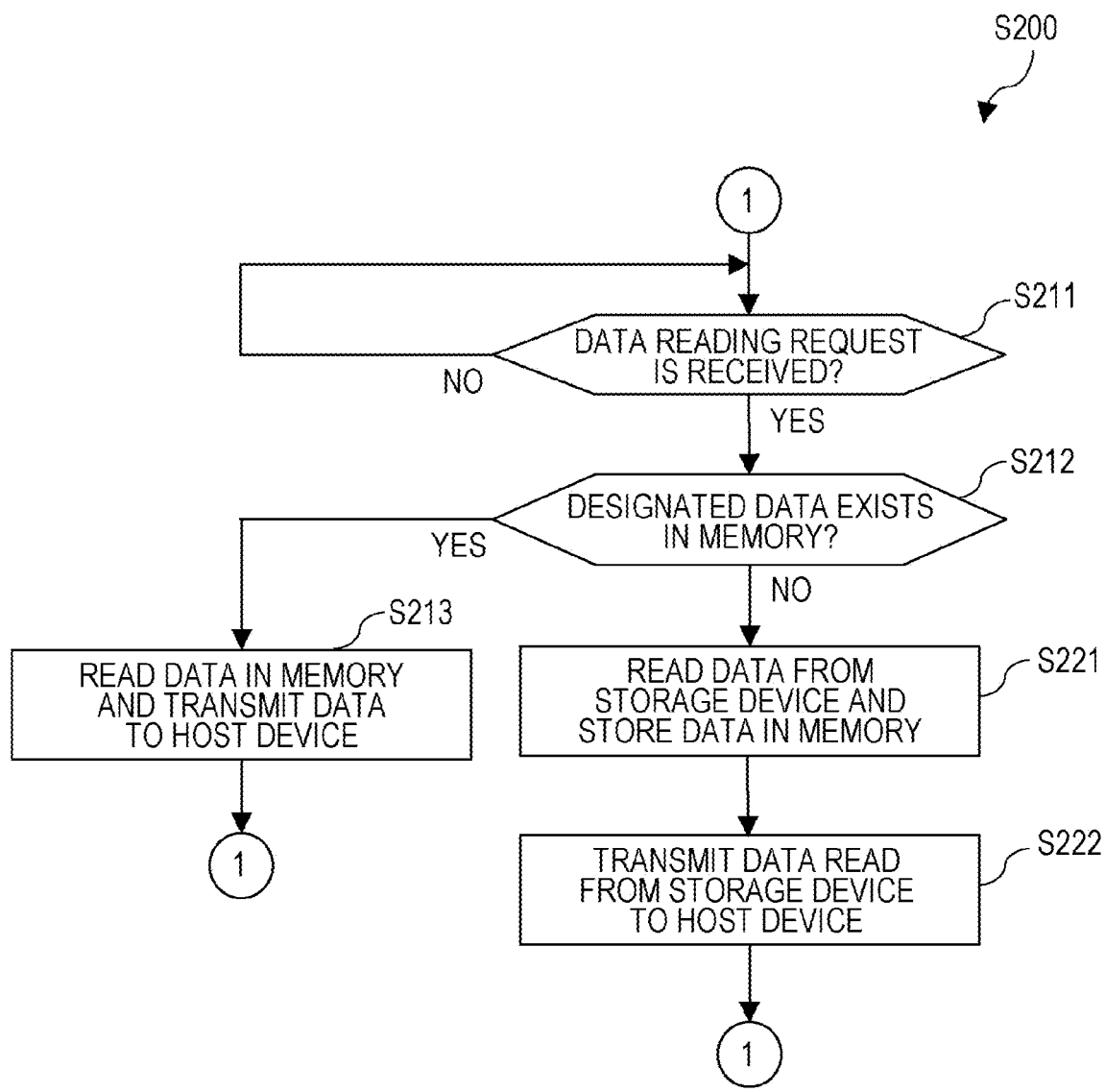

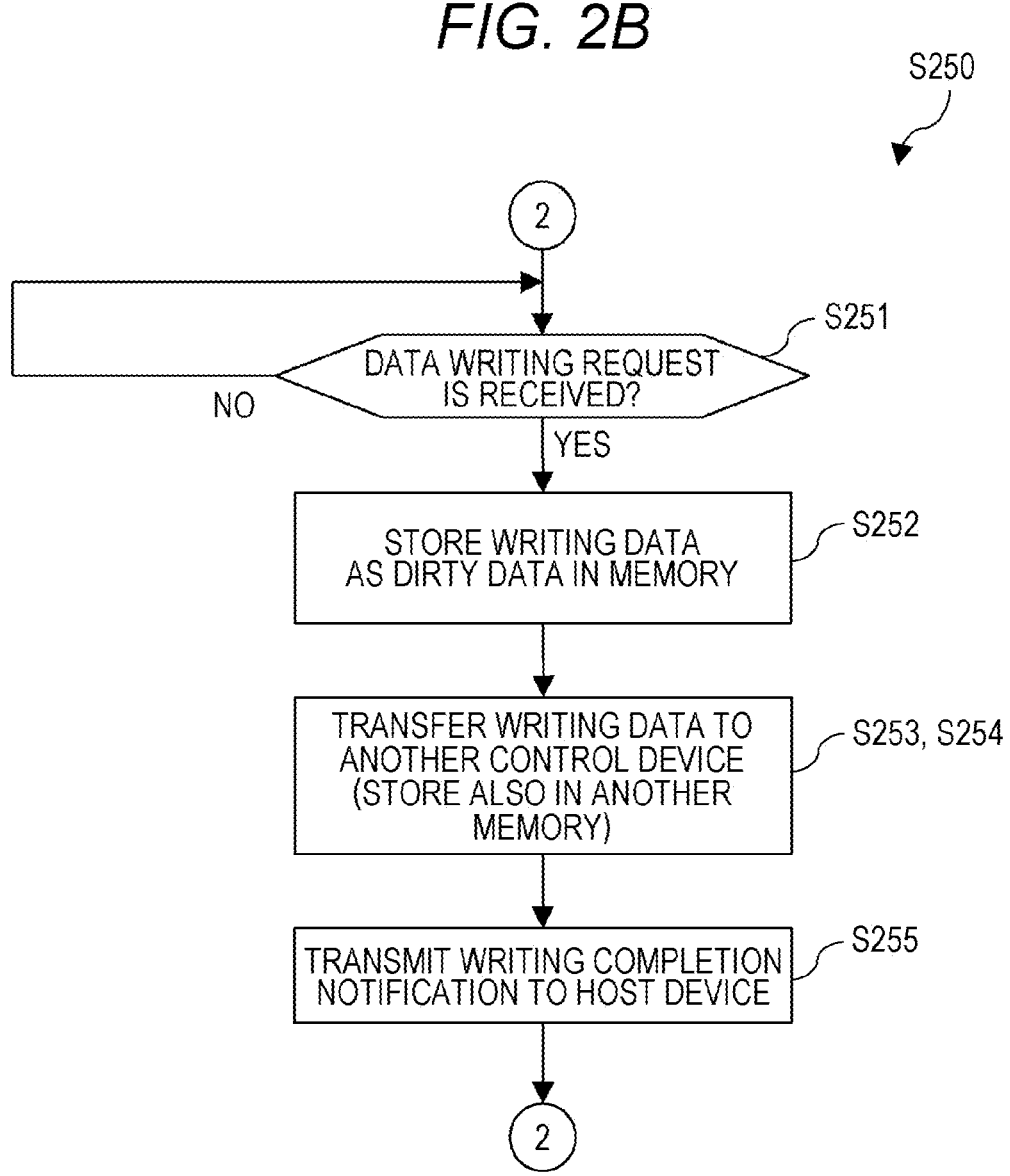

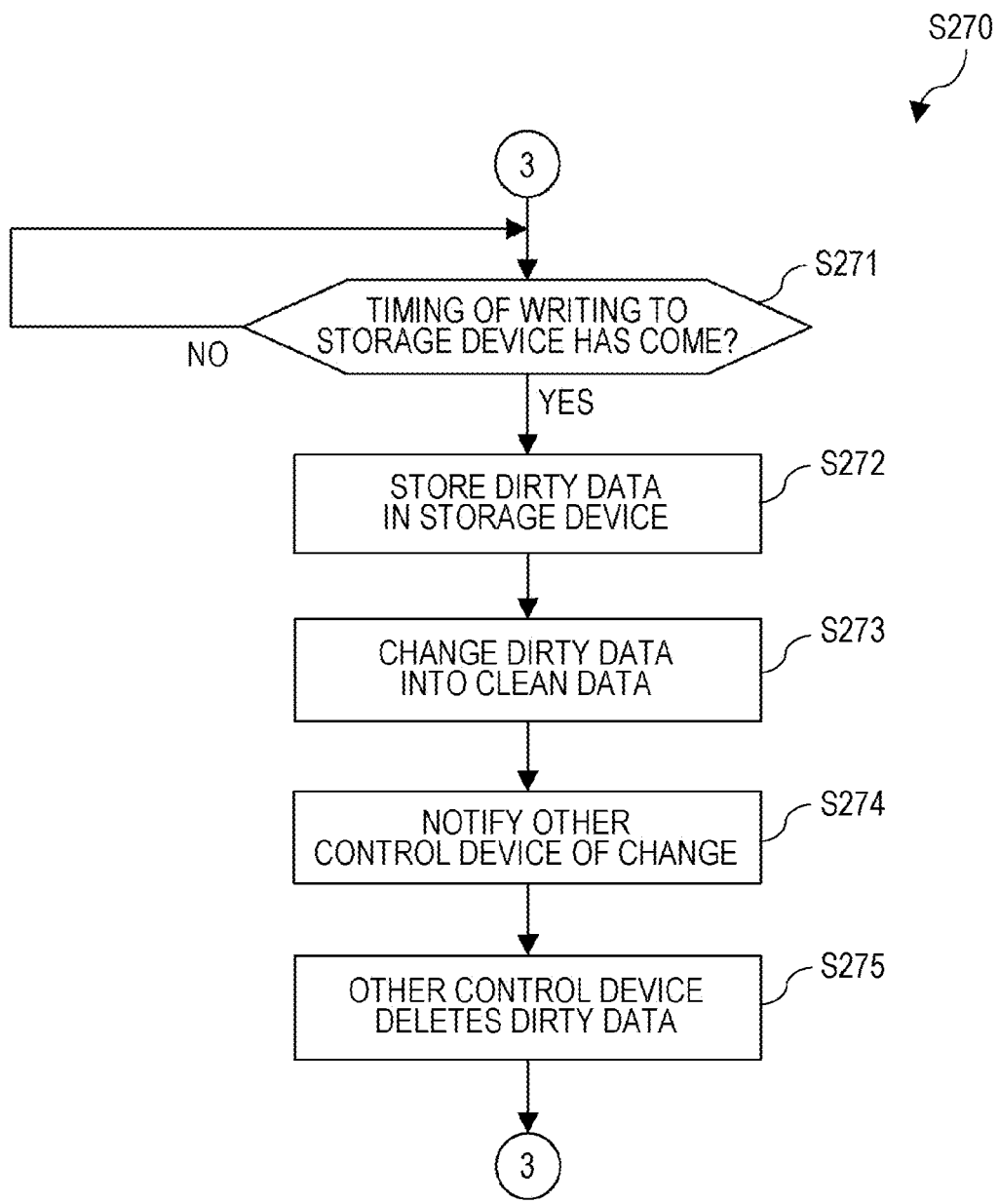

STORAGE APPARATUS AND CONTROL METHOD FOR STORAGE APPARATUS

BACKGROUND OF THE INVENTION

1. Field of the Invention

The present invention relates to a storage apparatus and a control method for the storage apparatus.

2. Description of the Related Art

In recent years, against the backdrop of advances in information technology (IT), the increase in the utilization rate of cloud-based computing and storage with the promotion of digital transformation (DX), and the like, now more than ever reliability and availability have been required of storage apparatuses operating in a data center (DC), an Internet data center (IDC), and the like. Therefore, various techniques for enhancing such reliability and availability have been proposed.

For example, JP 2016-513316 A discloses a data access system configured to solve a problem in which the performance of a central processing unit (CPU) of a control system functioning as an information providing side in two control systems is excessively consumed, and thus the reliability of the entire system is degraded. The data access system includes two memory sharing devices and two control devices connected to the memory sharing devices. The two memory sharing devices constitute a memory sharing resource pool in the data access system. The control devices correspond one-to-one with the memory sharing devices. When at least one of the two control devices reads data in the memory sharing resource pool, this control device reads required data in the memory sharing resource pool using the memory sharing device corresponding to this control device. The memory sharing devices belong to the same memory sharing resource pool and each has a plurality of memory units. The memory units are subject to uniform addressing in the entire memory sharing resource pool. Each memory sharing device processes a memory access request received from the control device and reads data from the memory units.

SUMMARY OF THE INVENTION

For the purpose of ensuring reliability and availability, the storage apparatus has a configuration in which a redundant control device that normally receives a data input-output (I/O) request sent from a host device and inputs and outputs data to and from a storage drive such as a solid state drive (SSD). Further, in the storage apparatus, the performance is enhanced by placing some data such as data having a high access frequency in a high-speed memory such as a dynamic random access memory (DRAM), and the availability is enhanced by placing the same data in a memory provided in each of the control devices for redundancy.

However, in the storage apparatus having such a redundant configuration, the redundancy is degraded due to shifting of one of the control devices to a power saving mode or blocking one of the control devices, and thus the availability is degraded. In addition, when one of the control devices is blocked, the operation is normally switched to an operation for directly writing data to the storage drive, but this degrades the performance of the storage apparatus.

JP 2016-513316 A discloses that the memory units are subject to uniform addressing in the entire memory sharing resource pool. However, this literature does not disclose a mechanism for ensuring the reliability and availability of data while maintaining the performance of the storage apparatus in a case where one of the control devices shifts to the power saving mode or is blocked.

An object of the present invention is to provide a storage apparatus and a control method for the storage apparatus capable of securing data reliability and availability while maintaining performance of the storage apparatus.

One embodiment of the present invention for achieving the above object is a storage apparatus communicably connected to another apparatus and performing data input-output (I/O) processing in a storage device in response to a data I/O request received from the another apparatus. The storage apparatus including two control devices including a first control device and a second control device communicably connected to each other, and three memories including a first memory, a second memory, and a third memory capable of being directly or indirectly accessed by the two control devices. The first memory stores drive control information that is information for managing association between a logical address and a physical address, the logical address being information indicating a location of data treated by the another apparatus in the data I/O processing, the physical address being information indicating a location of the data in the storage device, first cache data in the data I/O processing, and first cache control information that is information for managing association between the logical address of the first cache data and a cache address that is information indicating a location of the first cache data in the first memory. The second memory stores the drive control information, second cache data in the data I/O processing, and second cache control information that is information for managing association between the logical address of the second cache data and a cache address that is information indicating a location of the second cache data in the first memory. The third memory stores the drive control information, first dirty data that is dirty data of the first cache data, second dirty data that is dirty data of the second cache data, and third cache control information for managing association between the logical address of the first dirty data or the second dirty data and a cache address that is information indicating a location of the first dirty data or the second dirty data in the third memory. The data I/O processing is performed while the first dirty data and the second dirty data are redundantly stored in the three memories, wherein the first dirty data and the second dirty data are, for stopping a function of any one of the three memories, transferred among the three memories to redundantly store the first dirty data and the second dirty data in two memories among the three memories other than the any one memory that is stopped, and wherein after the function of the any one memory is stopped, the data I/O processing is performed while the first dirty data and the second dirty data are redundantly stored respectively in the two memories other than the any one memory that is stopped.

Problems, configurations, and effects other than those described above will be clarified by the following description of embodiments for implementing the invention.

According to the present invention, data reliability and availability can be secured while the performance of the storage apparatus is maintained.

BRIEF DESCRIPTION OF THE DRAWINGS

FIG. 2A is a flowchart illustrating one example of data reading processing;

FIG. 2B is a flowchart illustrating one example of data writing processing;

FIG. 2C is a flowchart illustrating one example of the processing for writing to a storage device;

FIG. 6 is a diagram explaining an operation of the storage apparatus in a case where the control device is blocked or the like;

FIG. 7 is a diagram explaining an operation of the storage apparatus in a case where the control device is blocked or the like;

FIG. 10A is a diagram explaining an operation of the storage apparatus in a case where the control device is blocked or the like;

DESCRIPTION OF THE PREFERRED EMBODIMENTS

Figure 1:
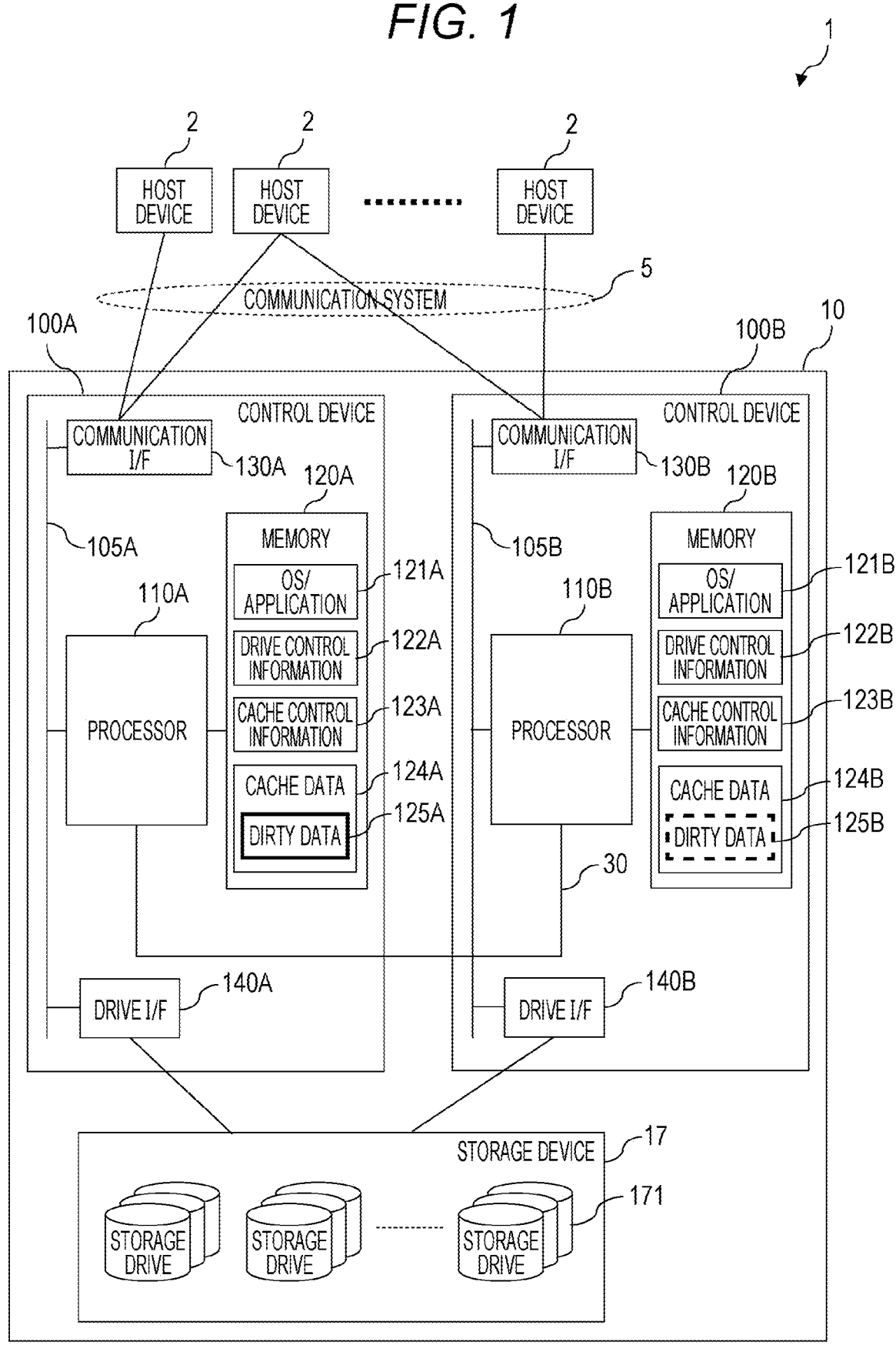
FIG. 1 is a diagram illustrating one example of a storage system.

Hereinafter, embodiments of the present invention will be described with reference to the drawings. Note that the following embodiments are merely examples for describing the present invention, and thus omission and simplification are appropriately made for clarity of description. The present invention can also be implemented in various modes other than those described herein. Unless s otherwise specified, as for each component, either a single component or a plurality of components may be provided.

In the following description, in a case where there is a plurality of configurations having common functions, the same reference numeral may be attached with different subscripts in order to distinguish each configuration. Further, in a case where the plurality of configurations does not have to be particularly distinguished, the description may be given with the subscripts being omitted.

In addition, expressions such as "identification information", "identifier", and "ID" are used when the configurations are described in distinction from each other, but these are interchangeable.

Further, in the following description, as an example of various types of information, expressions such as "information" and "data" are used, but various types of information may be expressed by a data structure ("table", "list", and the like) other than these.

Hereinafter, processing executed by various apparatuses functioning as an information processing apparatus (computer) executing a program may be described. The above information processing apparatus executes a processor (for example, a central processing unit (CPU) or a graphics processing unit (GPU)) program, and performs processing defined by the program while using a storage resource (for example, a memory) and an interface. Therefore, a subject of the processing performed by executing the program may be the processor. Similarly, the subject of the processing performed by executing the program may be a control device (controller), apparatus, system, computer, or node having a processor.

The subject of the processing performed by executing the program may function as at least an arithmetic unit, and may include a dedicated circuit, such as a field programmable gate array (FPGA), an application specific integrated circuit (ASIC), a complex programmable logic device (CPLD), that performs specific processing.

In the following description, input-output may be referred to as "I/O" (Input-Output), and an interface may be referred to as "I/F" (InterFace).

Further, in the following description, a letter "S" added before a reference numeral means a processing step.

FIG. 1 illustrates one example of a storage system 1 having a redundant configuration. The illustrated storage system 1 includes a host device 2 (also referred to as a "higher-level device", a "server device", an "external device", or the like), a communication system 5, and a storage apparatus 10.

The host device 2 is communicably connected to the storage apparatus 10 via the communication system 5. The communication system 5 is, for example, a storage network (a storage area network (SAN), a local area network (LAN), a wide area network (WAN), the Internet, or the like).

The host device 2 is an information processing device (computer) that uses a storage area provided by the storage apparatus 10 via the communication system 5 as a data storage location. The host device is a personal computer, an office computer, a mainframe, a smartphone, a tablet, or the like.

The storage apparatus 10 includes two control devices 100 (a control device 100A and a control device 100B) and a storage device 17. The two control devices 100 (the control device 100A and the control device 100B) and the storage device 17 are communicably connected via a high-speed serial communication I/F (SATA or the like), a LAN, a SAN, or the like.

When accessing the storage area, the host device 2 transmits to the storage apparatus 10 an I/O request (a data writing request for requesting writing of data to the storage device 17, and a data reading request for requesting reading of data from the storage device 17).

Which one of the two control devices 100 (the control device 100A and the control device 100B) that receives the data I/O request transmitted from the host device 2 to the storage apparatus 10 via the communication system 5 is determined by, for example, the configuration or setting of the host device 2 or the communication system 5.

The two control devices 100 (the control device 100A and the control device 100B) are provided in a housing (a case, a rack, etc.) of the storage apparatus 10 in a detachable state as, for example, independent substrates (circuit boards).

Note that the control device 100A and the control device 100B have a common basic configuration, and the elements having the same names have equivalent functions. Therefore, in order to avoid redundant description, in the following description, in principle only the control device 100A will be described when the common configuration will be described.

The control device 100A includes a processor 110A, a memory 120A, a communication I/F 130A, and a drive I/F 140A. These components are communicably connected to each other via an internal bus (a Peripheral Component Interconnect Express (PCIe) bus or the like) capable of high-speed communication. The processor 110A is communicably connected to the processor 110B of the control device 100B via an internal bus 30 (such as a PCIe bus).

The processor 110A is configured as an arithmetic core, a cache memory, direct memory access (DMA), and the like. In response to the I/O request transmitted from the communication I/F 130A, the processor 110A performs processing related to data transfer performed among the communication I/F 130A, the memory 120A, and the drive I/F 140A. For example, the processor 110A passes data between the communication I/F 130A and the drive I/F 140A (data read from the storage device 17 (hereinafter, referred to as "reading data") and data written to the storage device 17 (hereinafter, referred to as "writing data")) via the memory 120A. Further, the processor 110A performs staging of data to the memory 120A (reads data from the storage device 17 to the memory 120A) and destaging of data stored in the memory 120A (writes data from the memory 120A to the storage device 17).

The communication I/F 130A communicates with the host device 2 via the communication system 5. The communication I/F 130A receives a data I/O request transmitted from the host device 2, and transfers the received I/O request and data (for example, writing data) transmitted together with the I/O request to the processor 110A. The communication I/F 130A receives data (for example, reading data read from the storage device 17) transmitted from the processor 110A, and transmits the received data to the host device 2.

Further, the communication I/F 130A mutually converts a communication protocol used on the communication system 5 side and a communication protocol used on the control device 100A side in communication between the storage apparatus 10 and the host device 2 performed via the communication system 5. The communication I/F 130A is also referred to as a "host bus adaptor (HBA)". Examples of the communication protocol used on the communication system 5 side include fiber channel, Ethernet (registered trademark), and Internet Small Computer System Interface (iSCSI).

The memory 120A is configured using a storage element capable of accessing at a higher speed than a semiconductor storage device (solid state drive (SSD)), such as a dynamic random access memory (DRAM) or a hard disk drive (HDD). The memory 120A stores, for example, a program and data used for implementing the functions of the storage apparatus 10. The memory 120A also functions as a cache that enables a faster response than accessing the storage device 17 by temporarily storing the data of the storage device 17. Note that, hereinafter, temporary data written to the memory 120A is referred to as "cache data".

When reading data from the storage device 17 to the memory 120A or writing data from the memory 120A to the storage device 17, the drive I/F 140A performs processing related to data transfer with the storage device 17.

The storage device 17 includes one or more storage drives 171 that are recording media providing a physical storage area. The storage drive 171 is, for example, a semiconductor storage device (SSD) or a hard disk drive (HDD). The storage device 17 may be accommodated in the same housing as the storage apparatus 10, or may be accommodated in a housing different from the housing where the storage apparatus 10 is accommodated. For example, the storage apparatus 10 provides the host device 2 with the storage area as a logical storage area organized using a redundant array of inexpensive disks (RAID) technology or the like.

In addition to the above configuration, the storage apparatus 10 may include, for example, an information processing device (computer) (hereinafter, referred to as "management device") that monitors, controls, and sets each component of the storage apparatus 10. The management device includes a processor, a storage device (a memory, an SSD, etc.), a recording medium reading device (a device that reads data from a non-transitory storage medium), a communication device, and an input-output device (a keyboard, a mouse, a touch panel, a display, a speaker, etc.). The management device is communicably connected to each of the above-described components via a communication unit such as a LAN or an internal bus (PCIe or the like). Further, the management device may be connected to the storage apparatus 10 via, for example, a service processor (SVP) included in the storage apparatus 10. The management device transfers (writes, uploads, etc.) the program and data acquired via the communication device and the recording medium reading device to the components of the storage apparatus 10.

The memory 120A of the control device 100A stores information (data) about an operating system (OS)/application 121A, drive control information 122A, cache control information 123A, and cache data 124A.

As for the cache data 124A, clean data is distinguished from dirty data. Clean data is data of which writing to the storage device 17 is completed and consistency with corresponding data stored in the storage device 17 is guaranteed, and this data is included in the cache data 124A. On the other hand, dirty data is data of which writing to the storage device 17 is not completed, or data (data of which contents are not synchronized) which is stored in the storage device 17 and of which consistency with the corresponding data is not guaranteed, and such data is included in the cache data 124A. For example, data that has been stored in the memory 120A as the cache data 124A by a data writing request (including a case where the content of existing data is changed (updated)) but has not been completely written to the storage device 17 (updating has not been completed) is dirty data. In the drawing, the dirty data is indicated as "dirty data 125A".

The OS/application 121A is a program for implementing an operating system (hereinafter, also referred to as "OS") and various applications (hereinafter, also referred to as "apps"), a program for implementing a device driver, or the like.

For example, when a failure or a sign of a failure is detected in any of the control devices 100 (the control device 100A and the control device 100B), the OS/application 121A implements a function of blocking the control device 100 in which the failure or the sign of the failure has been detected (stopping the function of the data I/O processing). Note that the control device 100 in the blocked state does not receive the data I/O request from the host device 2.

The OS/application 121A implements, for example, a function of detecting a failure or a sign of a failure of the memory module 200.

In addition, the OS/application 121A implements a function (hereinafter, referred to as a "power saving function") of shifting one of the control devices 100 (the control device 100A and the control device 100B) from a normal operation state (hereinafter, referred to as a "normal mode") to a power-saving operation state (hereinafter, referred to as a "power saving mode") as compared with the normal mode in a period during which the load on the storage apparatus 10 is low, such as a period during which the number of data I/O requests received from the host device 2 is small. The control device 100 operating in the power saving mode stops the function of the data I/O processing similarly to the blocked case.

The drive control information 122A is information used when the processor 110A accesses the storage area provided by the storage device 17. The drive control information 122A includes information in which information (hereinafter, referred to as a "logical address") that is designated in the data I/O request of the host device 2 and indicates the locations of the writing data and the reading data is associated with information (hereinafter, referred to as a "physical address") that designates the storage areas in which the writing data and the reading data are stored. The logical address is, for example, a directory name (folder name), a file name, or a Uniform Resource Locator (URL).

The cache control information 123A is information used when the processor 110A accesses the cache data 124A stored in the memory 120A. The cache control information 123A includes information in which the logical address described above is associated with information (hereinafter, referred to as a "cache address") designating a storage area of the memory 120A, the storage area being a storage destination of the cache data.

As illustrated in the drawing, the memory 120B of the control device 100B stores each piece of information (data) of OS/application 121B, drive control information 122B, cache control information 123B, and cache data 124B. Similarly to the cache data 124A, the cache data 124B includes clean data and dirty data ("dirty data 125B" in the drawing).

The respective pieces of information stored in the memory 120A of the control device 100A and the respective pieces of information stored in the memory 120B of the control device 100B having common names with the respective pieces of information basically have similar meanings and properties.

The processor 110A manages, in the memory 120A, information (for example, flags) indicating whether the respective pieces of the cache data 124A stored in the memory 120A are clean data or the dirty data 125A, for example, as information attached to the cache data 124A.

The processor 110B manages, in the memory 120B, information (for example, flags) indicating whether the respective pieces of the cache data 124B stored in the memory 120B are clean data or the dirty data 125B, for example, as information attached to the cache data 124B.

Basic Operation of Control Device

Next, a basic operation of the control device 100 will be described. Note that although the operation of the control device 100A will be described below, the operation of the control device 100B is basically similar to that of the control device 100A.

FIG. 2A is a flowchart explaining main processing (hereinafter, referred to as "data reading processing S200") performed by the control device 100A in a case where a data reading request is received from the host device 2. Hereinafter, the data reading processing S200 will be described with reference to the flowchart.

The control device 100A monitors the reception of the data reading request from the host device 2 in real time (S211: NO). When receiving the data reading request from the host device 2 (S211: YES), the control device 100A checks whether the data designated by the data reading request is stored in the memory 120A (as the cache data 124A) with reference to the cache control information 123A (S212).

In a case where the above data is stored as the cache data 124A in the memory 120A (S212: YES), the control device 100A transmits the data as reading data to the host device 2 (S213). Thereafter, the processing returns to S211.

On the other hand, in a case where the data is not stored in the memory 120A (S212: NO), the control device 100A reads the data from the storage device 17 and stores (performs staging on) the data as the cache data 124A in the memory 120A (S221). The control device 100A then transmits the data as reading data to the host device 2 (S222). Thereafter, the processing returns to S211.

As described above, when the data designated by the data reading request exists as the cache data 124A in the memory 120A, the control device 100A reads the data from the memory 120A and transmits the data to the host device 2. Therefore, the read data can be provided to the host device 2 at high speed.

FIG. 2B is a flowchart explaining main processing (hereinafter, referred to as "data writing processing S250") performed by the control device 100A in a case where a data writing request is received from the host device 2. Hereinafter, the data writing processing S250 will be described with reference to the flowchart.

The control device 100A monitors the reception of the data writing request from the host device 2 in real time (S251: NO). When receiving the data writing request from the host device 2 (S251: YES), the control device 100A stores the writing data, as the cache data 124A, received together with the data writing request in the memory 120A (S252). Note that the writing data stored in the memory 120A is dirty data 125A.

Subsequently, the control device 100A communicates with the control device 100B via the internal bus 30, and transfers the writing data received from the host device 2 to the control device 100B (S253). The control device 100B receives the writing data from the control device 100A, and stores the received writing data as cache data 124B (the dirty data 125B) in the memory 120B (S254).

Subsequently, the control device 100A transmits to the host device 2 a notification (hereinafter, referred to as a "writing completion notification") indicating that the processing of the data writing request has been completed (S255).

FIG. 2C is a flowchart explaining main processing (hereinafter, referred to as "processing for writing data to the storage device S270") performed when the control device 100A writes (performs destaging on) the dirty data 125A stored in the memory 120A to the storage device 17. Hereinafter, the processing for writing data to the storage device S270 will be described with reference to the flowchart.

The control device 100A monitors whether the timing of writing the dirty data 125A stored in the memory 120A to the storage device 17 has come in real time (S271: NO). Note that the above timing has come, for example, when a predetermined time has elapsed from the time point when the writing data is written to the memory 120A.

When the above timing has come (S271: YES), the control device 100A stores, in the storage device 17, the dirty data 125A stored in the memory 120A (S272). Thereafter, the dirty data 125A is deleted or changed into clean data (S273).

Subsequently, the control device 100A notifies the control device 100B via the internal bus 30 that the dirty data 125A has been deleted or changed into clean data (S274). Upon receiving the notification, the control device 100B deletes the dirty data 125B corresponding to the dirty data 125A from the memory or changes the dirty data into clean data (S275).

As described above, according to the exemplified storage apparatus 10, even in a case where one of the two control devices 100 (the control device 100A and the control device 100B) is blocked (stops functioning), the service to the host device 2 can be continued by the other 100 control device 100.

However, in a case where one of the control devices 100 is blocked, the redundancy of the dirty data 125A or the dirty data 125B is impaired, and the availability is degraded. For this reason, in the case where one of the control devices 100 is blocked, for example, the operation is switched to an operation for directly writing data to the storage drive 171 having lower performance than the memory 120, but the performance of the storage apparatus 10 is thus degraded.

Further, the storage apparatus 10 has the following problems in a case where one of the control devices (the control device 100A and the control device 100B) is shifted from the normal mode to the power saving mode by the power saving function.

(1) In a case where one control device 100 operating in the normal mode receives a new data I/O request, the other control device 100 operating in the power saving mode has to be returned to the normal mode and store (duplicate) dirty data in the other control device 100. This weakens the effect of the power saving function.

(2) In a case where the return of the other control device 100 to the normal mode is not performed in order to enhance the effect of the power saving function, the one control device 100 operating in the normal mode has to write (perform destaging on) the dirty data to the storage device 17 in order to secure the redundancy of the dirty data. This degrades the performance of the storage apparatus 10.

Therefore, in the present invention, the storage apparatus 10 has the following configuration to solve the above problems.

First Embodiment

Figure 3:
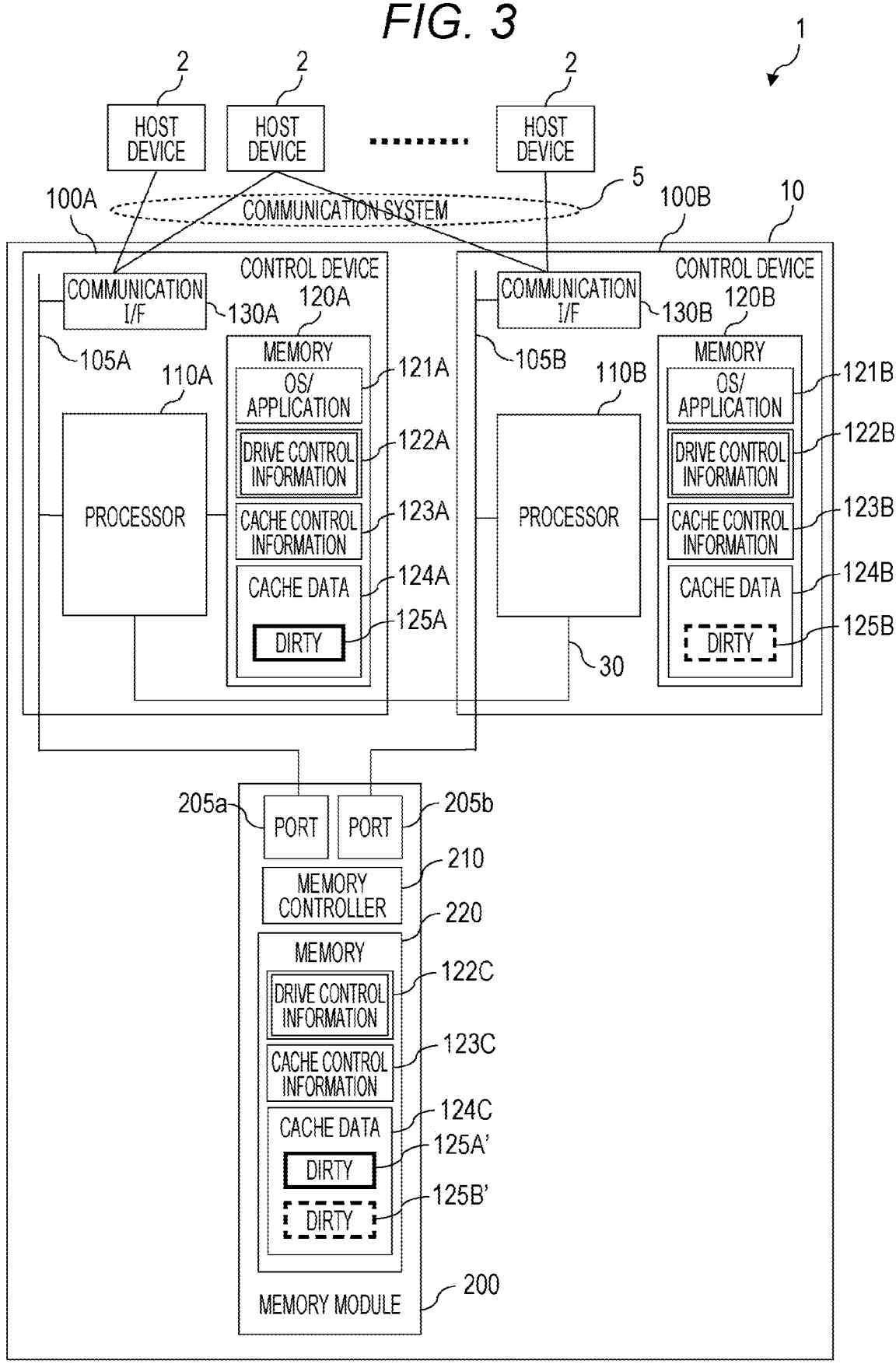
FIG. 3 is a diagram illustrating a schematic configuration of the storage system according to a first embodiment.

FIG. 3 illustrates a configuration of the storage system 1 illustrated as the first embodiment. The storage system 1 illustrated in the drawing is different in configuration from the storage system 1 illustrated in FIG. 1 in that the storage apparatus 10 further includes a memory module 200. Note that, in the configuration of the storage apparatus 10, the storage device 17 is similar to that in FIG. 1, and thus is omitted in each of the drawings referred to below. In the drawing referred to in the following description, "dirty data" is expressed simply as "dirty".

For example, the memory module 200 is provided in a housing of the storage apparatus 10 in a detachable state as a substrate (circuit board) independent of the two control devices 100 (the control device 100A and the control device 100B). Power is supplied to the memory module 200 independently of the two control devices 100 (the control device 100A and control device 100B). Therefore, even when power supply to the control device 100 is lost, data loss can be prevented.

As illustrated in the drawing, the memory module 200 includes two ports 205 (a port 205a and a port 205b), a memory controller 210, and a memory 220. The memory controller 210 and the memory 220 are communicably connected via a bus (PCIe or the like) not illustrated.

The memory controller 210 writes and reads data to and from the memory 220 in response to an instruction sent from the processor 110A of the control device 100A. Further, the memory controller 210 writes and reads data to and from the memory 220 in response to an instruction sent from the processor 110B of the control device 100B.

The memory 220 includes a volatile storage element, such as a dynamic random access memory (DRAM), capable of high-speed access. In addition, the memory 220 may include a nonvolatile storage element (non-volatile random access memory (NVRAM)) that backs up data of the volatile storage element in order to prevent data loss in a case where power supply is lost.

As illustrated in the drawing, the memory 220 stores drive control information 122C, cache control information 123C, and cache data 124C.

Among such information, the drive control information 122C is information that is referred to when the processor 110A or the processor 110B accesses the storage area provided by the storage device 17, and includes information in which a logical address and a physical address are associated with each other. With the drive control information 122C, consistency of contents between the drive control information 122A and the drive control information 122B is maintained by the control device 100A or the control device 100B communicating with the memory module 200 via the port 205.

The cache control information 123C is information used when the processor 110A or the processor 110B accesses the cache data 124C stored in the memory 220. The cache control information 123C includes information in which a logical address is associated with a cache address of the memory 220 that is the storage destination of the cache data. The cache control information 123C is updated to the latest state by the memory controller 210 along with the update of the cache data 124C.

The cache data 124C includes dirty data 125A' having the same content as the dirty data 125A stored in the memory 120A and dirty data 125B' having the same content as the dirty data 125B stored in the memory 120B. In the drawing, the dirty data 125A and the dirty data 125A' are indicated by the same thick line frame, and the dirty data 125B and the dirty data 125B' are indicated by the same broken line frame.

The memory module 200 communicates with the processor 110A of the control device 100A via the I/O bus 105A and the port 205a. Further, the memory module 200 communicates with the processor 110B of the control device 100B via the I/O bus 105B and the port 205b. These communications are performed by using functions such as PCIe and Compute Express Link (CXL).

Both the port 205a and the port 205b cannot be used at the same time, and the memory module 200 communicates with the control device 100A or the control device 100B using either one of the selected ports 205. For example, in a case where the port 205a is selected, only the control device 100A can directly access (read and write data) to the memory 220 of the memory module 200. For example, in a case where the port 205b is selected, only the control device 100B can directly access the memory 220 of the memory module 200.

However, even in the case where the port 205a is selected, the control device 100B can indirectly access the memory 220 via the internal bus 30, the control device 100A, the I/O bus 105A, and the port 205a using a function of Non Transparent Bridge (NTB) or the CXL. Similarly, even in the case where the port 205*b* is selected, the control device 100A can indirectly access the memory 220 via the internal bus 30, the control device 100B, the I/O bus 105B, and the port 205*b* using the function of the NTB or the CXL.

The port 205 is selected (switched) by, for example, transmitting a selection instruction (switching instruction) of the port 205 from the control device 100A or the control device 100B, a management device, not illustrated, or the like to the memory module 200.

The I/O bus 105A has a function of maintaining coherency between a cache memory, not illustrated, inside the processor 110A and cache data 124C in the memory 220 of the memory module 200. In a case where the processor 110A accesses the memory module 200 via the I/O bus 105A, the cache data 124C in the memory module 200 is stored in the cache memory of the processor 110A. In a case where the processor 110A accesses the same data again, a high-speed operation is achieved by accessing data stored in the cache memory inside the processor 110A. The same applies also to the I/O bus 105B.

Note that, for example, in a case where the port 205*a* is selected and the memory 220 of the memory module 200 is occupied by the processor 110A, the data in the memory module 200 accessed by the processor 110B via the processor 110A may be cached in the cache memory inside the processor 110B. In this case, the processor 110A cannot grasp that the data in the cache memory inside the processor 110B has been updated. Therefore, when the processor 110B writes data to the memory 120B, for example, the above-described data is also written to the memory 220 by the function of the NTB or the CXL using a writing-through method. The same applies to a case where the processor 110A accesses the memory module 200 via the processor 110B in a case where the port 205*b* is selected and the memory 220 of the memory module 200 is occupied by the processor 110B.

Data Reading Processing

Next, an operation of the storage apparatus 10 in a case where the storage apparatus 10 illustrated in FIG. 3 receives a data reading request from the host device 2 (another device) will be described.

Figure 4:
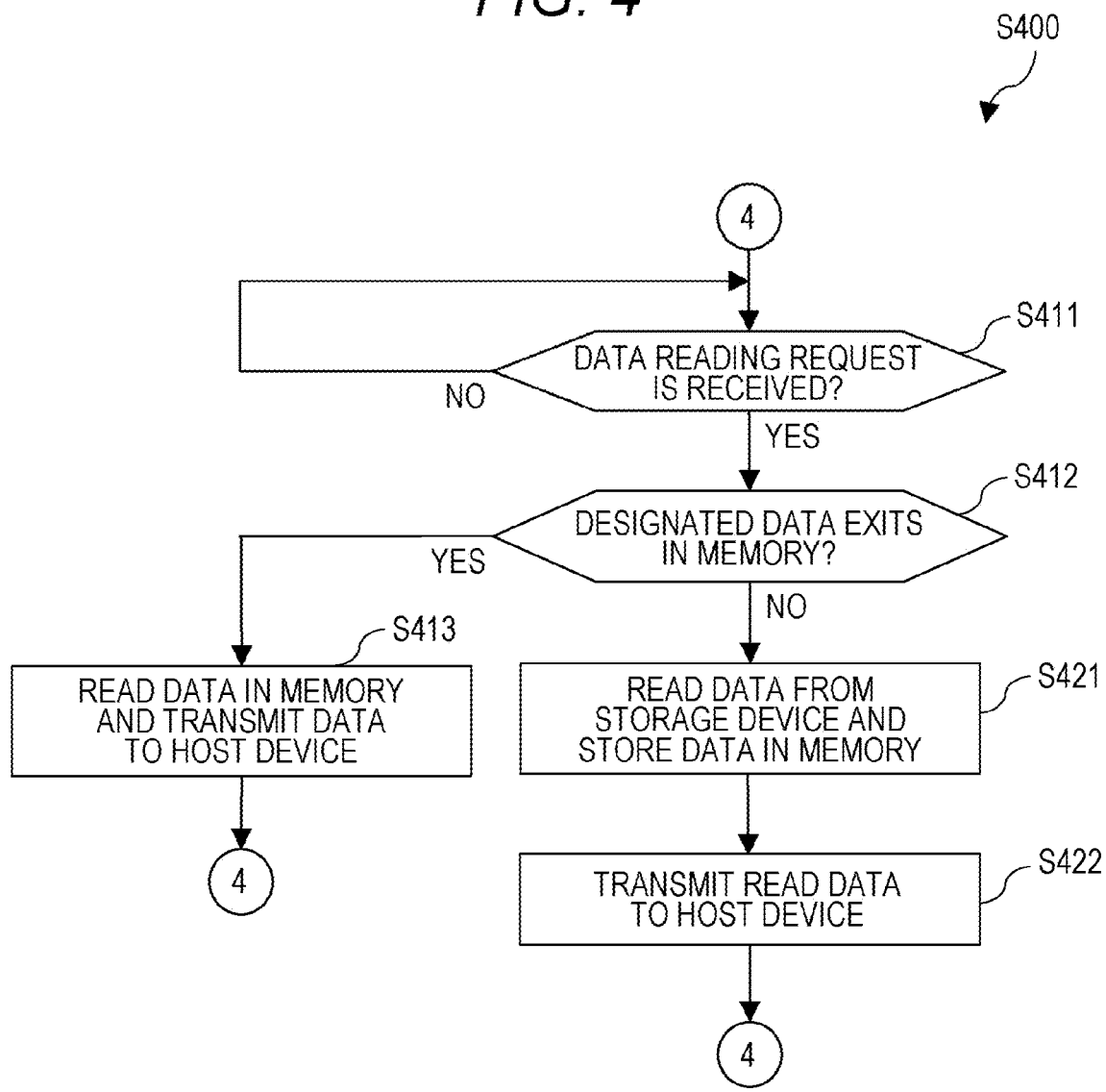
FIG. 4 is a flowchart illustrating one example of the data reading processing.

FIG. 4 is a flowchart explaining main processing (hereinafter, referred to as "data reading processing S400") performed in a case where the control device 100A of the storage apparatus 10 illustrated in FIG. 3 receives a data reading request from the host device 2. Hereinafter, the data reading processing S400 will be described with reference to the flowchart.

As illustrated in the flowchart, the control device 100A monitors the reception of the data reading request from the host device 2 in real time (S411: NO). When receiving the data reading request from the host device 2 (S411: YES), the control device 100A checks whether the data designated by the data reading request is stored in the memory 120A (as the cache data 124A) with reference to the cache control information 123A (S412).

In a case where the above data is stored in the memory 120A (S412: YES), the control device 100A transmits the cache data 124A stored in the memory 120A as reading data to the host device 2 (S413). Thereafter, the processing returns to S411.

On the other hand, in a case where the above data is not stored in the memory 120A (S412: NO), the control device 100A reads the data from the storage device 17 and stores (performs staging on) the data in the memory 120A as the cache data 124A (S421). The control device 100A then transmits the data as reading data to the host device 2 (S422). Thereafter, the processing returns to S411.

Note that the same processing as described above is also performed in a case where the control device 100B of the storage apparatus 10 illustrated in FIG. 3 receives the data reading request from the host device 2.

Data Writing Processing

Next, an operation of the storage apparatus 10 in a case where the control device 100A of the storage apparatus 10 receives a data writing request from the host device 2 will be described. Note that in the following description it is assumed that the memory 220 of the memory module 200 is occupied by the processor 110A (the port 205*a* is selected).

Figure 5A:
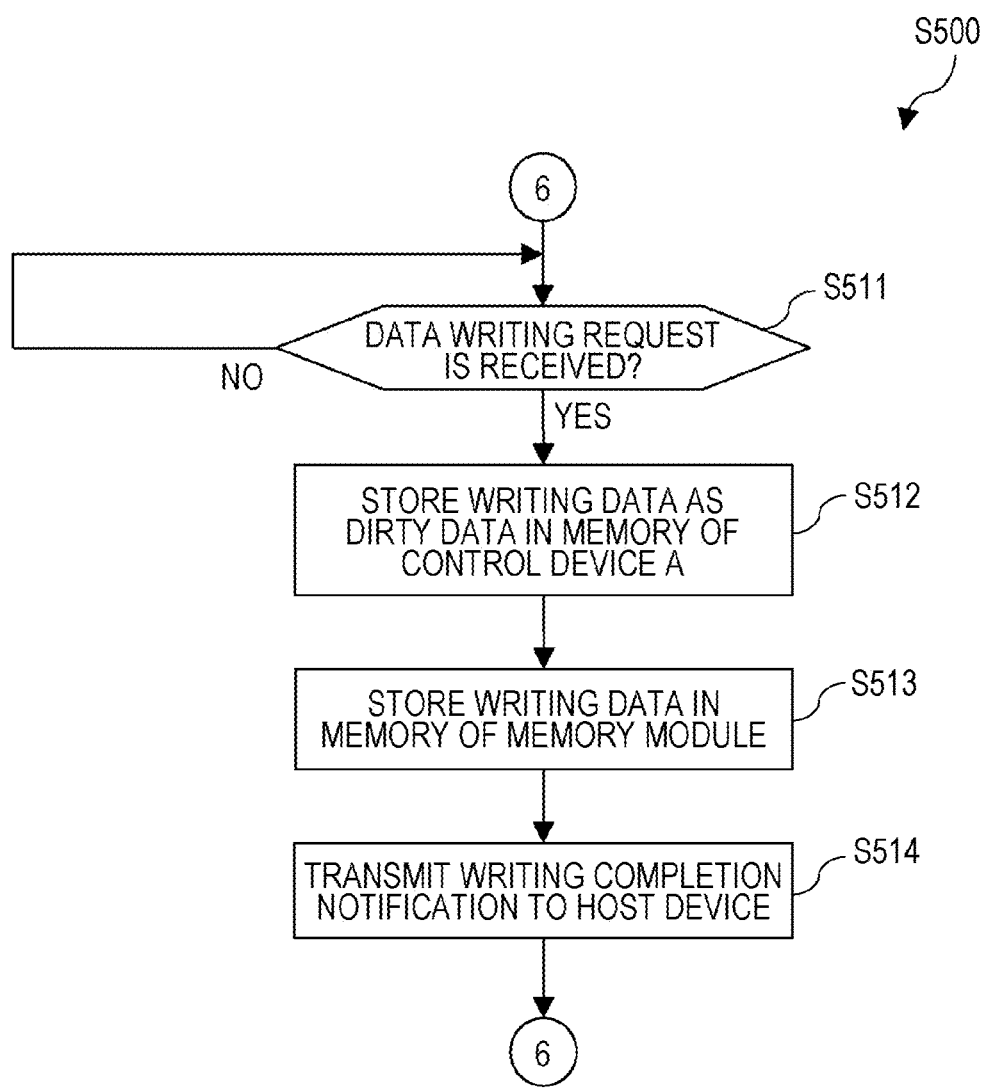
FIG. 5A is a flowchart illustrating one example of the data writing processing.

FIG. 5A is a flowchart explaining main processing (hereinafter, referred to as "data writing processing S500") performed by the control device 100A in a case where the control device 100A of the storage apparatus 10 receives the data writing request from the host device 2. Hereinafter, the data writing processing S500 will be described with reference to the flowchart.

As illustrated in the flowchart, the control device 100A monitors the reception of the data writing request from the host device 2 in real time (S511: NO). When receiving the data writing request from the host device 2 (S511: YES), the control device 100A stores the writing data received together with the data writing request as the cache data 124A in the memory 120A. Further, the control device 100A updates the cache control information 123A to the latest state (S512). Note that the writing data stored in the memory 120A is dirty data 125A.

Subsequently, the control device 100A directly accesses the writing data received from the host device 2 via the I/O bus 105A, and accesses the memory 220 of the memory module 200 to store the writing data as the cache data 124C. Further, the control device 100A updates the cache control information 123C to the latest state (S513). Note that the writing data stored in the memory 220 is dirty data 125A'.

Subsequently, the control device 100A transmits to the host device 2 a notification (hereinafter, referred to as a "writing completion notification") indicating that the processing of the data writing request has been completed (S514). Thereafter, the processing returns to S511.

As described above, the dirty data in the control device 100A is made redundant (is duplicated as the dirty data 125A and the dirty data 125A') in the control device 100A and the memory module 200.

Figure 5B:
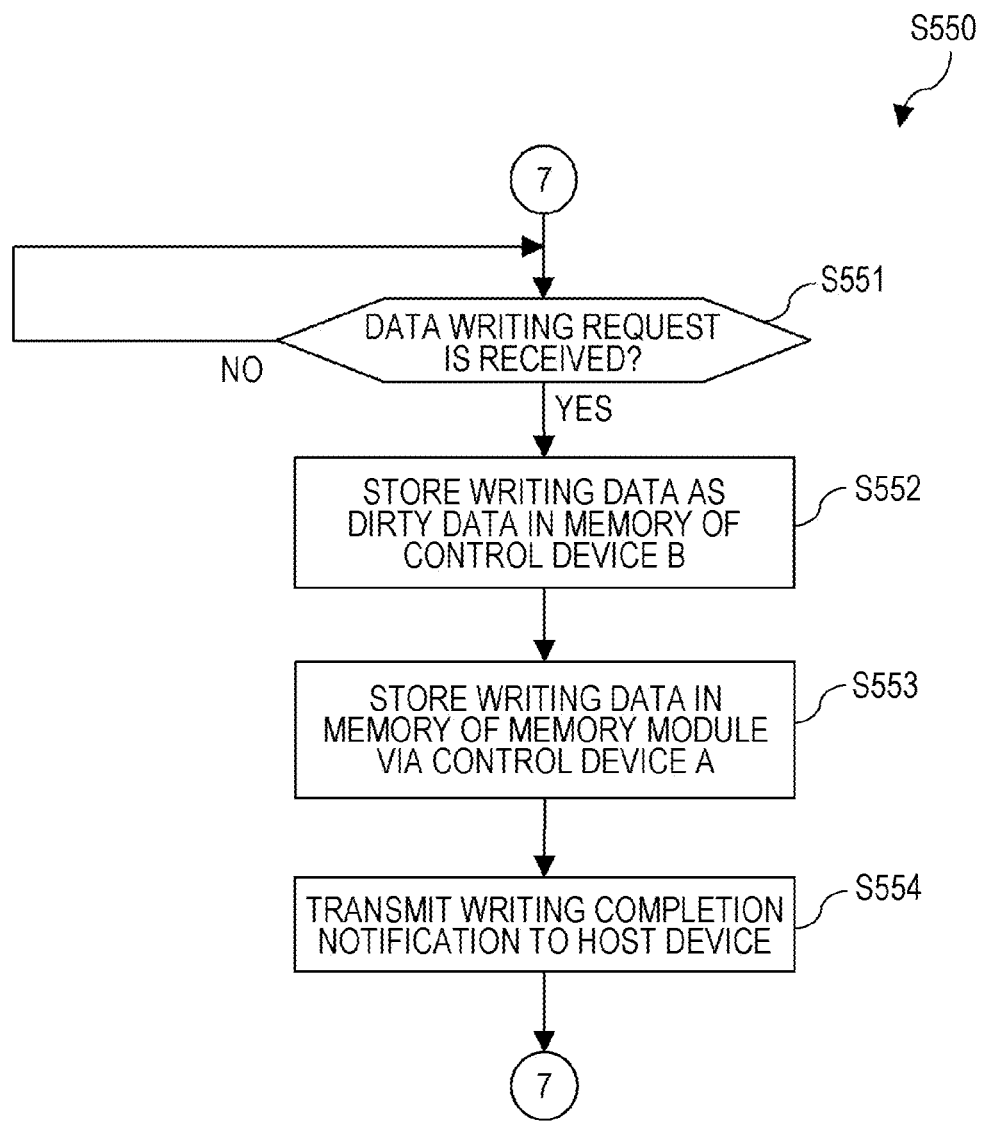
FIG. 5B is a flowchart illustrating one example of the data writing processing.

FIG. 5B is a flowchart explaining main processing (hereinafter, referred to as "data writing processing S550") performed by the control device 100A in a case where the control device 100B of the storage apparatus 10 receives the data writing request from the host device 2 when the memory 220 of the memory module 200 is occupied by the processor 110A (the port 205*a* is selected). Hereinafter, the data writing processing S500 will be described with reference to the flowchart.

As illustrated in the flowchart, the control device 100B monitors the reception of the data writing request from the host device 2 in real time (S551: NO). When receiving the data writing request from the host device 2 (S551: YES), the control device 100B stores writing data received together with the data writing request as the cache data 124B in the memory 120B. Further, the control device 100B updates the cache control information 123B (S552). Note that the writing data stored in the memory 120B is dirty data 125B.

Subsequently, the control device 100B stores the writing data in the memory 220 of the memory module 200. Here, since the memory 220 of the memory module 200 is occupied by the processor 110A, the control device 100B cannot directly access the memory 220 of the memory module 200. Therefore, the control device 100B indirectly accesses the memory 220 of the memory module 200 via the internal bus 30, the processor 110A, the I/O bus 105A, and the port 205a of the control device 100A by using the function of the NTB or the CXL, and stores the writing data as the cache data 124C in the memory 220. Further, the control device 100B updates the cache control information 123C to the latest state (S553). Note that the writing data stored in the memory 220 is dirty data 125B'.

Subsequently, the control device 100B transmits to the host device 2 a notification (hereinafter, referred to as a "writing completion notification") indicating that the processing of the data writing request has been completed (S554). Thereafter, the processing returns to S551.

As described above, the dirty data of the control device 100B is made redundant (is duplicated as the dirty data 125B and dirty data 125B') in the control device 100B and the memory module 200.

Writing Dirty Data in Storage Device

Figure 5C:
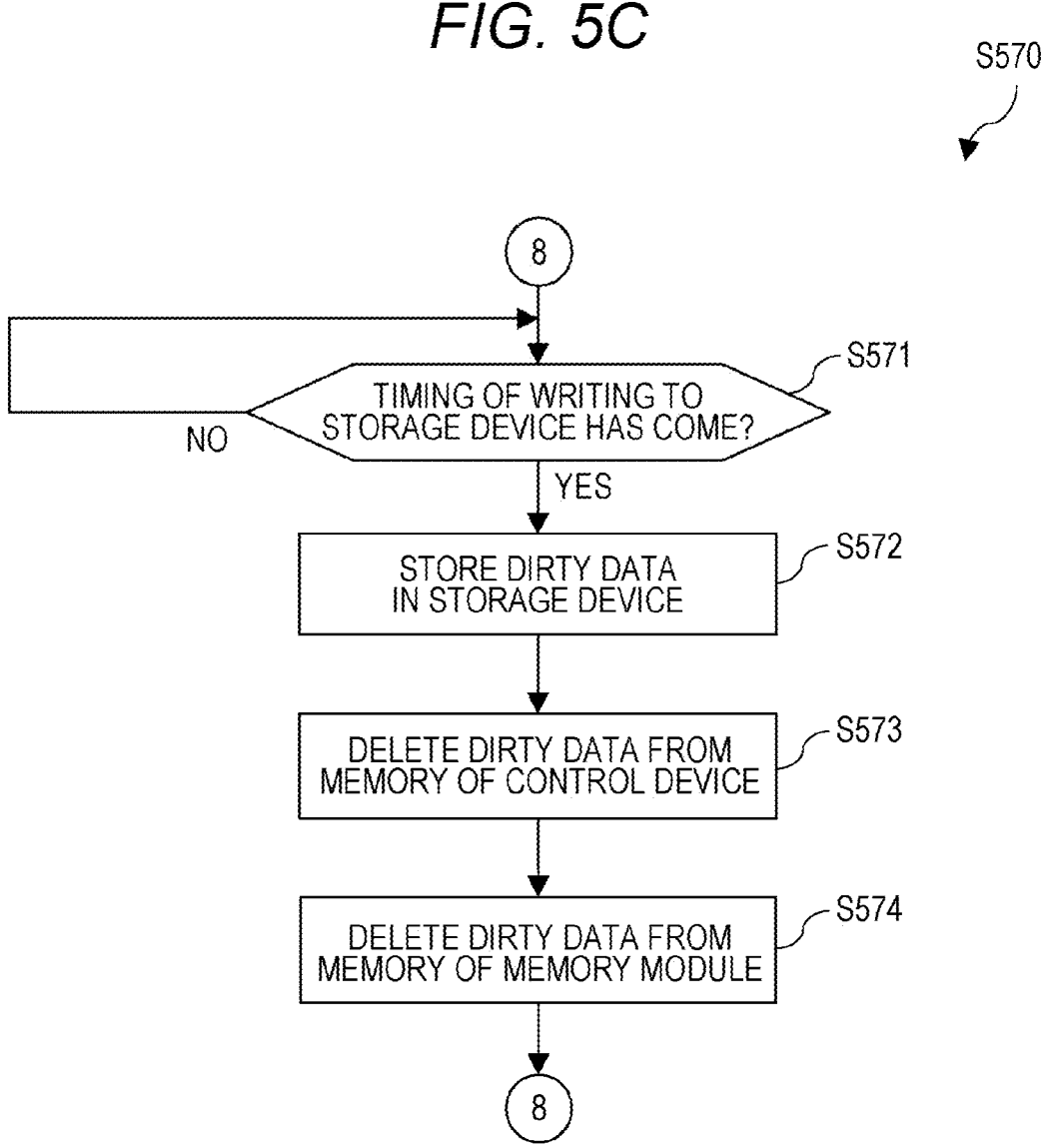
FIG. 5C is a flowchart illustrating one example of the processing for writing to the storage device.

FIG. 5C is a flowchart explaining processing (hereinafter, referred to as "processing for writing data to storage device S570") performed when the control device 100A writes (performs destaging on), to the storage device 17, the dirty data 125A stored in the memory 120A and the dirty data 125A' stored in the memory 220 of the memory module 200. Note that, in the following description, it is assumed that the memory 220 of the memory module 200 is occupied by the processor 110A (the port 205a is selected). Hereinafter, the processing for writing data to storage device S570 will be described with reference to the flowchart.

As illustrated in the flowchart, the control device 100A monitors whether the timing of writing the dirty data 125A stored in the memory 120A to the storage device 17 has come in real time (S571: NO). Note that the above timing has come, for example, when a predetermined time has elapsed from the time point when the writing data is written to the memory 120A.

When the above timing has come (S571: YES), the control device 100A stores (performs destaging on), in the storage device 17, the dirty data 125A stored in the memory 120A (S572).

The control device 100A then deletes the dirty data 125A from the memory 120A or changes the dirty data 125A to clean data (S573).

The control device 100A then accesses the memory module 200 via the I/O bus 105A and the port 205a, and deletes the dirty data 125A' stored in the memory 220 or changes the dirty data to clean data (S574). Thereafter, the processing returns to S571.

Note that similar processing as described above is also performed when the control device 100B writes (performs destaging on) the dirty data 125B stored in the memory 120B and the dirty data 125B' stored in the memory 220 of the memory module 200 to the storage device 17. However, since the memory 220 of the memory module 200 is occupied by the processor 110A (the port 205a is selected), the control device 100B uses the function of NTB or CXL to indirectly issue an instruction to the memory module 200 via the control device 100A, thereby deleting the dirty data 125B' stored in the memory 220 of the memory module 200 or changing it to clean data.

Operation in Case of Blocking One of Control Devices or Shifting One of Control Devices to Power Saving Mode Next, an operation of the storage apparatus 10 in a case where the storage apparatus 10 having the above configuration shifts one of the control devices 100 to the power saving mode or blocks the one control device 100 will be described.

Figure 6:
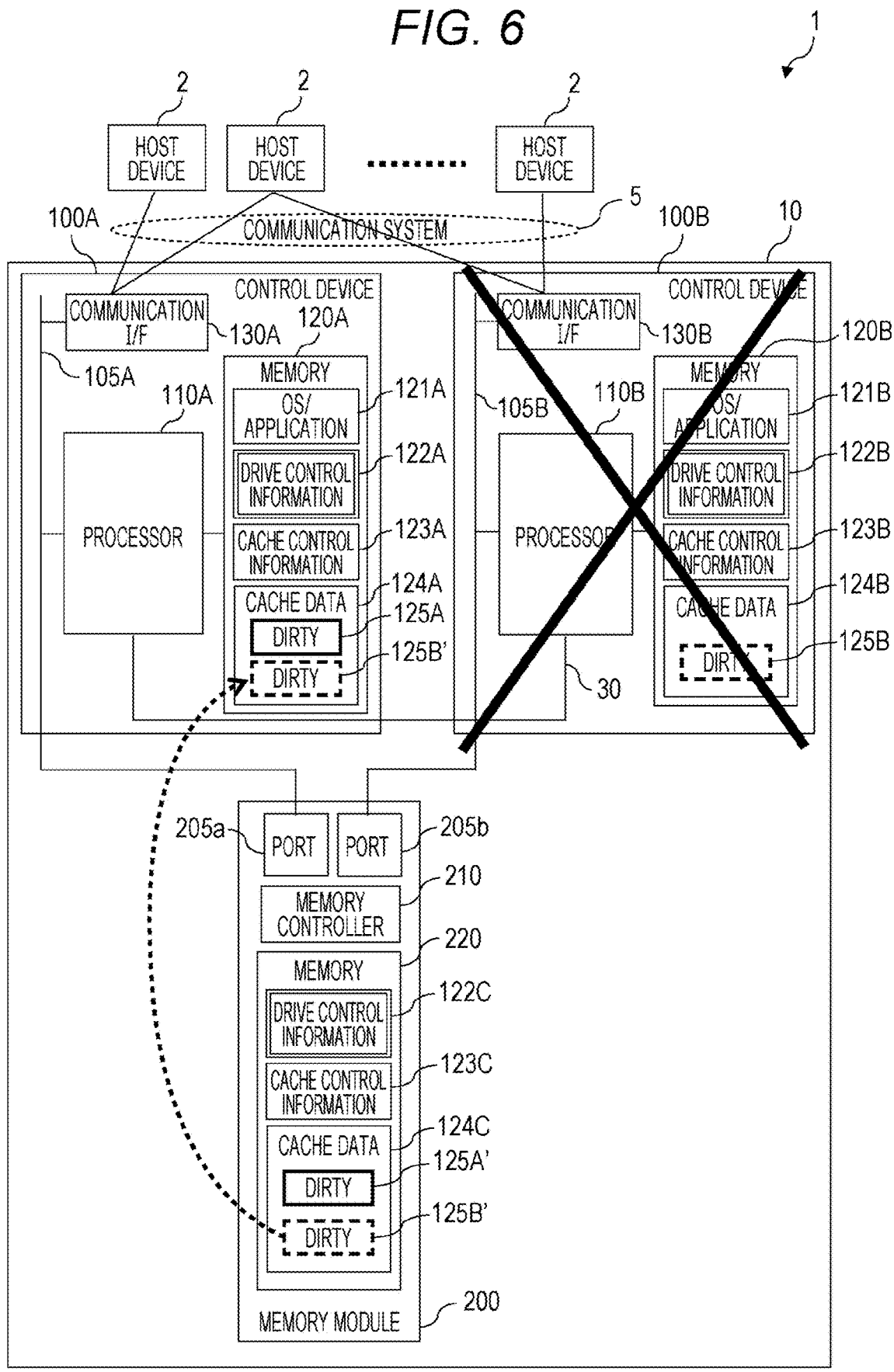

FIG. 6 is a diagram explaining the operation of the storage apparatus 10 in the case where the memory 220 of the memory module 200 is occupied by the processor 110A (the port 205a is selected) and the control device 100B is shifted to the power saving mode or is blocked.

As illustrated in the drawing, when the control device 100B is shifted to the power saving mode or is blocked, the control device 100A (the processor 110A) directly accesses the memory 220 of the memory module 200 via the I/O bus 105A and the port 205a to read the dirty data 125B' stored in the memory 220 and store the read dirty data 125B' in the memory 120A. Further, the control device 100A updates the cache control information 123A to the latest state.

Subsequently, the storage apparatus 10 shifts the control device 100B to the power saving mode or blocks the control device 100B.

The storage apparatus 10 then starts processing of the data I/O request transmitted from the host device 2 by the control device 100A and the memory module 200.

As described above, even after the control device 100B shifts to the power saving mode or is blocked, the dirty data of the control device 100B is duplicated in the control device 100A and the memory module 200, and redundancy of the dirty data can be secured. Further, switching to an operation for directly writing data to the storage drive 171 does not have to be performed, and the performance of the storage apparatus 10 can be maintained.

In the above description, the dirty data 125B' in the memory 220 of the memory module 200 is transferred to the memory 120A of the control device 100A. However, the dirty data 125B in the memory 120B of the control device 100B may be transferred to the memory 120A of the control device 100A via the internal bus 30 using the function of NTB or CXL.

Note that, in a state where the memory 220 of the memory module 200 is occupied by the processor 110B (the port 205b is selected), also when the control device 100A is shifted to the power saving mode or is blocked, the same operation as described above is performed.

Figure 7:
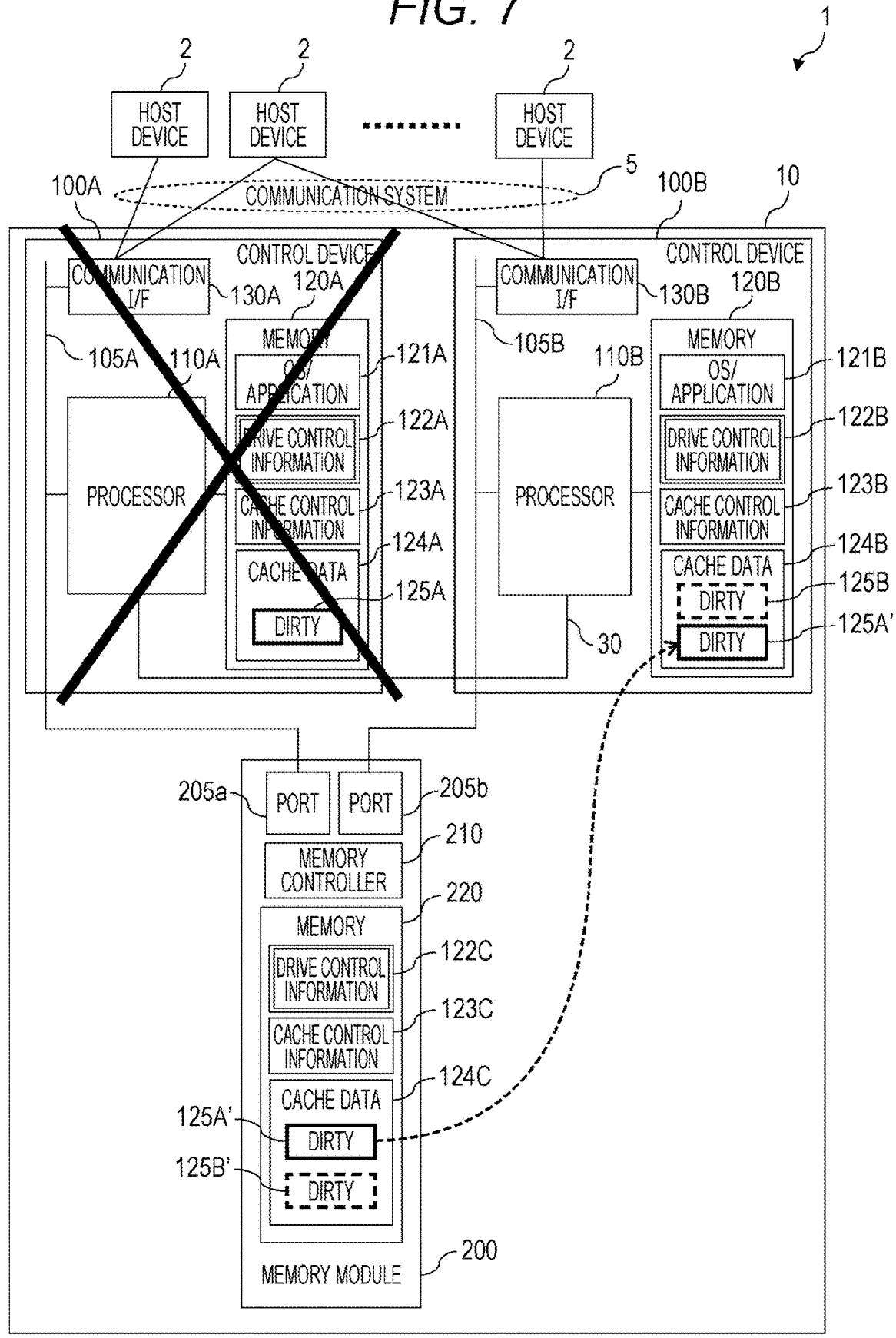

FIG. 7 is a diagram explaining the operation of the storage apparatus 10 in a case where the control device 100A is blocked in a state in which the memory 220 of the memory module 200 is occupied by the processor 110A (the port 205a is selected).

When detecting a failure or a sign of a failure of the control device 100A, the processor 110A of the control device 100A first directly accesses the memory 220 of the memory module 200 via the I/O bus 105A and the port 205a to write updated data stored in its internal cache memory (not illustrated).

Subsequently, the processor 110A of the control device 100A reads the dirty data 125A' stored in the memory 220 of the memory module 200 via the I/O bus 105A and the port 205a, and stores the read dirty data 125A' in the memory 120B via the internal bus 30 and the processor 110B of the control device 100B using the function of NTB or CXL. Further, the control device 100B updates the cache control information 123B to the latest state.

Subsequently, the storage apparatus 10 blocks the control device 100A.

The control device 100B then transmits, a switching instruction for the ports 205 (the instruction for switching from the port 205a to the port 205b) to the memory module 200 via the I/O bus 105A.

When receiving the above instruction, the memory module 200 switches the port 205 (switches from the port 205*a* to the port 205*b*) in response to the received instruction, and transmits a port switching completion notification to the control device 100B (the processor 110B).

When receiving the completion notification, the control device 100B maps an address space of the memory 220 of the memory module 400 to its own address space (the storage area of the memory 220 can be designated by the address of the address space managed by itself). Firmware of the control device 100B determines whether the memory module 200 is directly connected via the I/O bus 105B and the port 205*b* or indirectly connected via the control device 100A using the function of NTB or CXL, and maps the address space of the memory module 200. The firmware then notifies an operating system (OS) of the control device 100B about a head address of the mapped address space. The OS notifies an app (an application running on the OS) of the notified head address. The app manages an offset (relative address) used in the drive control information 122B and the cache control information 123B, and accesses the drive control information 122C and the cache control information 123C of the memory module 200 using the head address (base address) and the offset notified from the OS.

The storage apparatus 10 then starts the processing of the data I/O request transmitted from the host device 2 by the control device 100B and the memory module 200.

As described above, in a case where the control device 100A is blocked in a state where the memory 220 of the memory module 200 is occupied by the control device 100A (the processor 110A) (the port 205*a* is selected), the dirty data of the control device 100A is duplicated in the control device 100B and the memory module 200, and the redundancy of the dirty data can be secured. Further, switching to an operation for directly writing data to the storage drive 171 does not have to be performed in order to secure the redundancy of the dirty data, and degradation of the performance of the storage apparatus 10 can be prevented.

Meanwhile, although the processor 110A of the control device 100A reads the dirty data 125A' and stores the dirty data in the memory 120B via the processor 110B of the control device 100B in the above description, the control device 100B may read the dirty data 125A' and store the dirty data in the memory 120B after the control device 100A is blocked.

Note that the same operation as described above is also performed in a case where the control device 100B is blocked in a state where the memory 220 of the memory module 200 is occupied by the processor 110B (the port 205*b* is selected).

Figure 8:
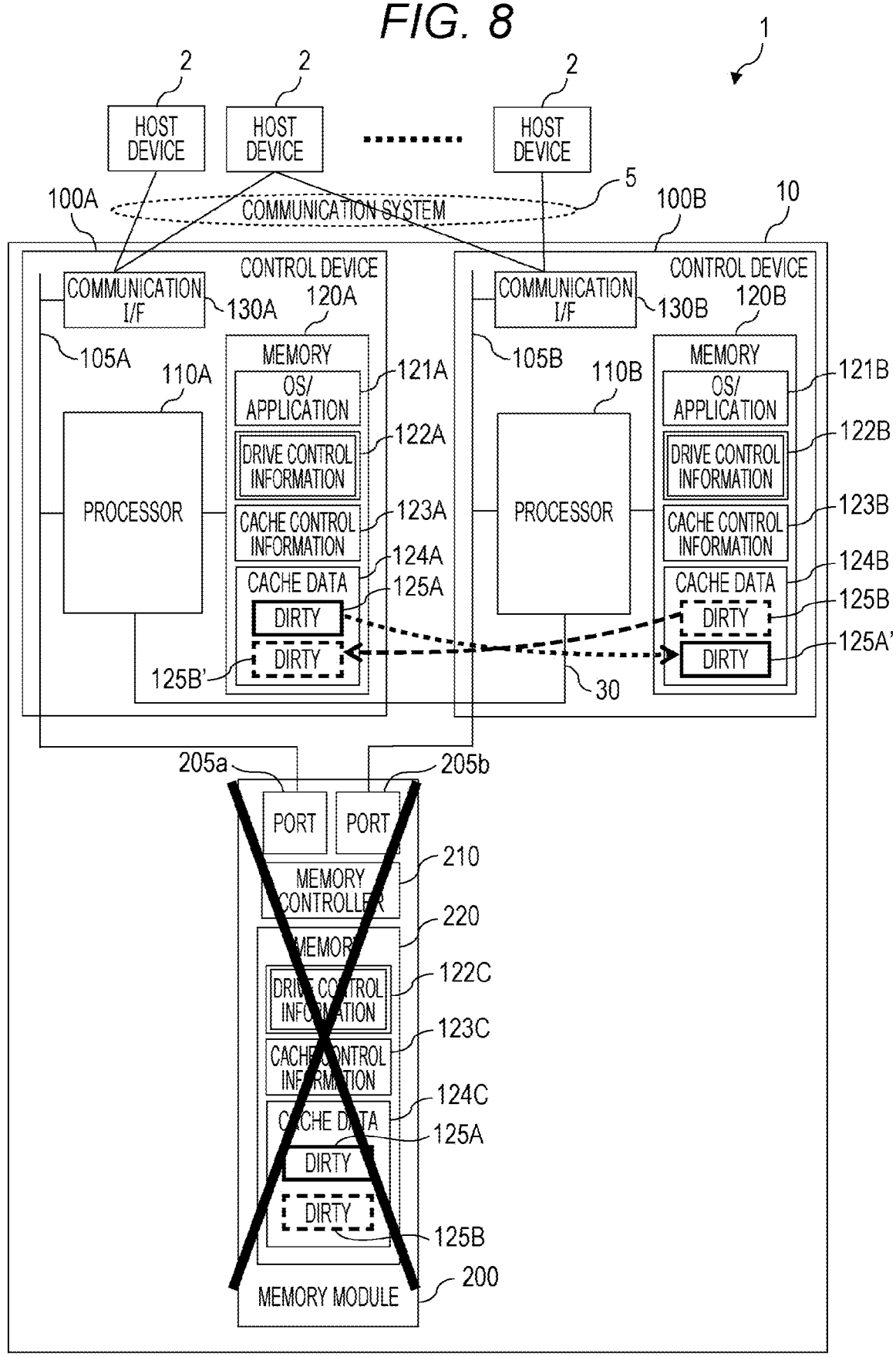
FIG. 8 is a diagram explaining an operation of the storage apparatus in a case where a memory module is blocked.

FIG. 8 is a diagram explaining an operation of the storage apparatuses 10 (the control device 100A and the control device 100B) in a case where a failure or a sign of a failure of the memory module 200 is detected.

When a failure or a sign of a failure of the memory module 200 is detected in the storage apparatus 10, the processor 110A of the control device 100A first reads the dirty data 125A stored in the memory 120A, and transmits the read dirty data 125A to the processor 110B of the control device 100B via the internal bus 30. The processor 110B of the control device 100B receives the dirty data 125A transmitted from the control device 100A, and stores the received dirty data 125A as the dirty data 125A' in the memory 120B. Further, the control device 100B updates the cache control information 123B to the latest state at that time.

On the other hand, the processor 110B of the control device 100B reads the dirty data 125B stored in the memory 120B, and transmits the read dirty data 125B to the processor 110A of the control device 100A via the internal bus 30. The processor 110A of the control device 100A receives the dirty data 125B transmitted from the control device 100B, and stores the received dirty data 125B as the dirty data 125B' in the memory 120B. Further, the control device 100A updates the cache control information 123A to the latest state at that time.

Thereafter, the storage apparatus 10 processes the data I/O request transmitted from the host device 2 while the dirty data 125 (the dirty data 125A and the dirty data 125B) is redundantly stored by the control device 100A and the control device 100B.

For example, when receiving a data write request from the host device 2, the control device 100A stores writing target data of the received data writing request as the dirty data 125A in the memory 120A, and updates the cache control information 123A to the latest state. In addition, the control device 100A transmits the dirty data 125A to the control device 100B via the internal bus 30. When receiving the dirty data 125A, the control device 100B stores the received writing data as the dirty data 125A' in the memory 120B, and updates the cache control information 123B to the latest state.

For example, when receiving a data writing request from the host device 2, the control device 100B stores writing target data of the received data writing request as the dirty data 125B in the memory 120B, and updates the cache control information 123B to the latest state. Further, the control device 100B transmits the dirty data 125B to the control device 100A via the internal bus 30. When receiving the dirty data 125B, the control device 100A stores the received writing data as the dirty data 125B' in the memory 120A, and updates the cache control information 123A to the latest state.

Note that the dirty data 125A and the dirty data 125B' stored in the memory 120A and the dirty data 125B and the dirty data 125A' stored in the memory 120B are written to the storage device 17, and then are subject to destaging at a predetermined timing. Thereafter, these pieces of data are deleted from the memory 120A or the memory 120B, or are changed to clean data.

As described above, the dirty data 125A of the control device 100A is duplicated in the control device 100A and the control device 100B, and redundancy of the dirty data 125A of the control device 100A can be secured. The dirty data 125B of the control device 100B is duplicated in the control device 100A and the control device 100B, and redundancy of the dirty data 125B of the control device 100B can be secured. Further, switching to the operation for directly writing data to the storage drive 171 does not have to be performed, and the performance of the storage apparatus 10 can be maintained.

Second Embodiment

Figure 9:
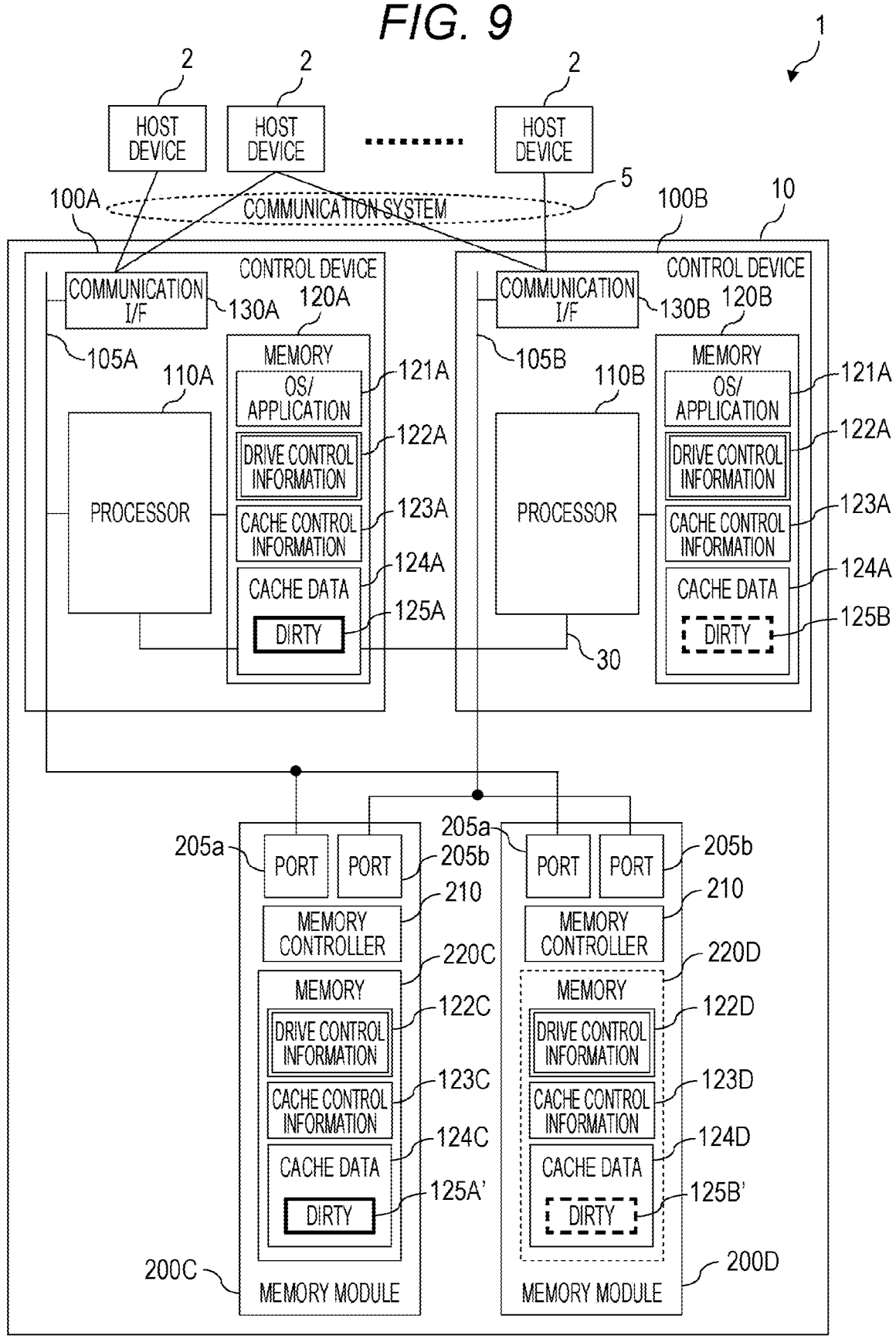
FIG. 9 is a diagram illustrating a schematic configuration of a storage system according to a second embodiment.

FIG. 9 illustrates a configuration of a storage system 1 according to a second embodiment. The storage system 1 illustrated in the drawing is different in configuration from the storage system 1 illustrated in FIG. 3 in that the storage apparatus 10 further includes two memory modules 200C and 200D.

As illustrated in the drawing, the cache data 124C of the memory module 200C includes dirty data 125A' having the same content as the dirty data 125A stored in the memory 120A of the control device 100A. Further, the cache data 124D in the memory 220D of the memory module 200D includes dirty data 125B' having the same content as the dirty data 125B stored in the memory 120B of the control device 100B.

In this example, in a state where any control device 100 (the control device 100A and the control device 100B) of the storage apparatus 10 is functioning (a state where a data I/O request is received from the host device 2 and corresponding data I/O processing can be performed; hereinafter, referred to as a "normal state"), the port 205a is selected for the memory module 200C, and the port 205b is selected for the memory module 200D. Therefore, the control device 100A can directly access the memory 220C of the memory module 200C via the port 205a, and the control device 100B can also directly access the memory 220D of the memory module 200D via the port 205b.

Figure 10A:
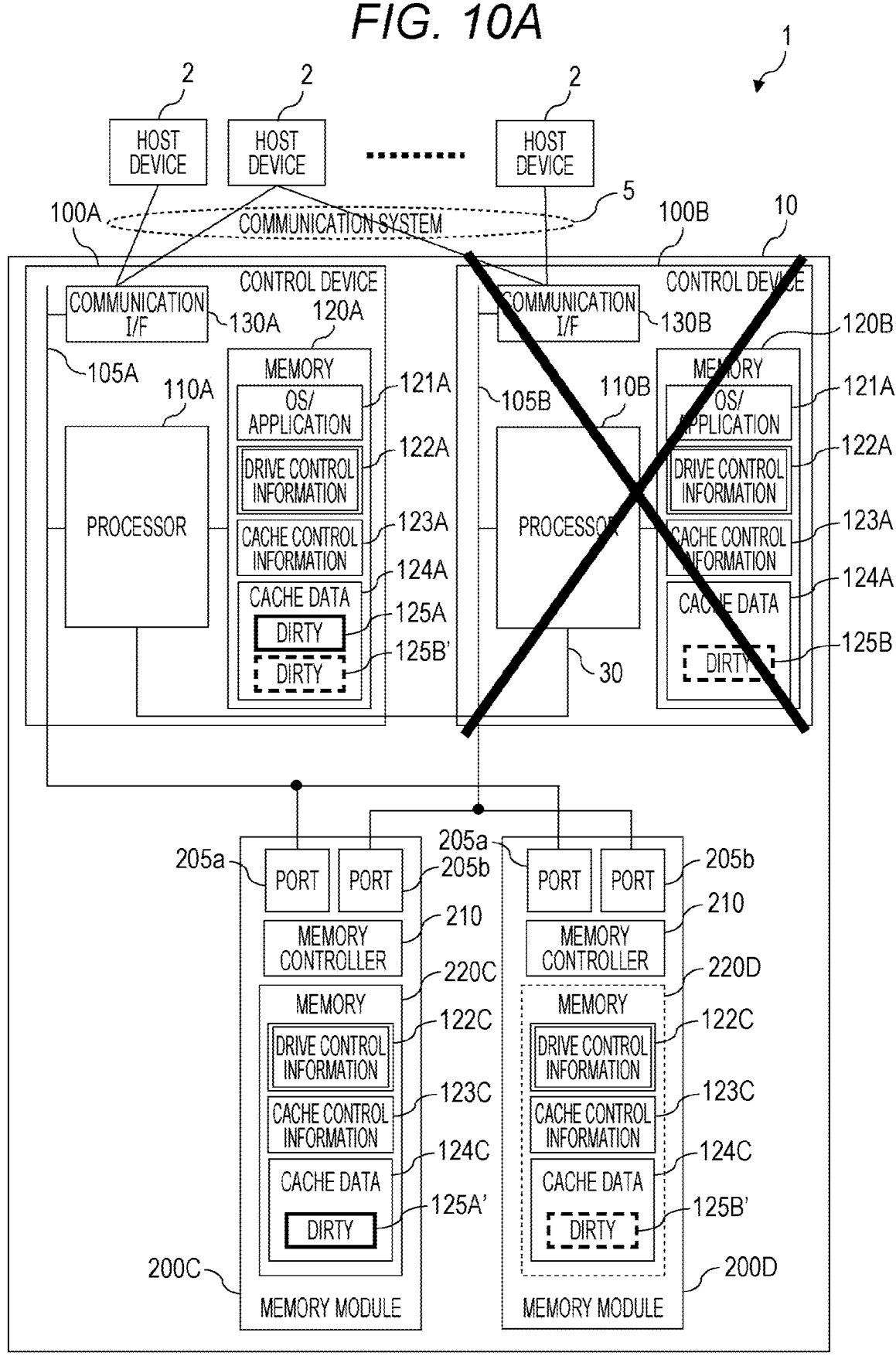

Here, as illustrated in FIG. 10A, in a case where the control device 100B is shifted to the power saving mode or is blocked, the dirty data 125B is stored as the dirty data 125B' in the memory 120A of the control device 100A, and thus the redundancy of the dirty data 125B is secured even after the control device 100B is shifted to the power saving mode or is blocked. In this case, the control device 100A may acquire the dirty data 125B from the control device 100B via the internal bus 30, or may acquire the dirty data from the memory 220D of the memory module 200D via the control device 100B by the function of NTB or CXL. Note that the redundancy of the dirty data 125B can also be secured by a mechanism similar to the above in a case where the control device 100A is shifted to the power saving mode or is blocked.

Figure 10B:
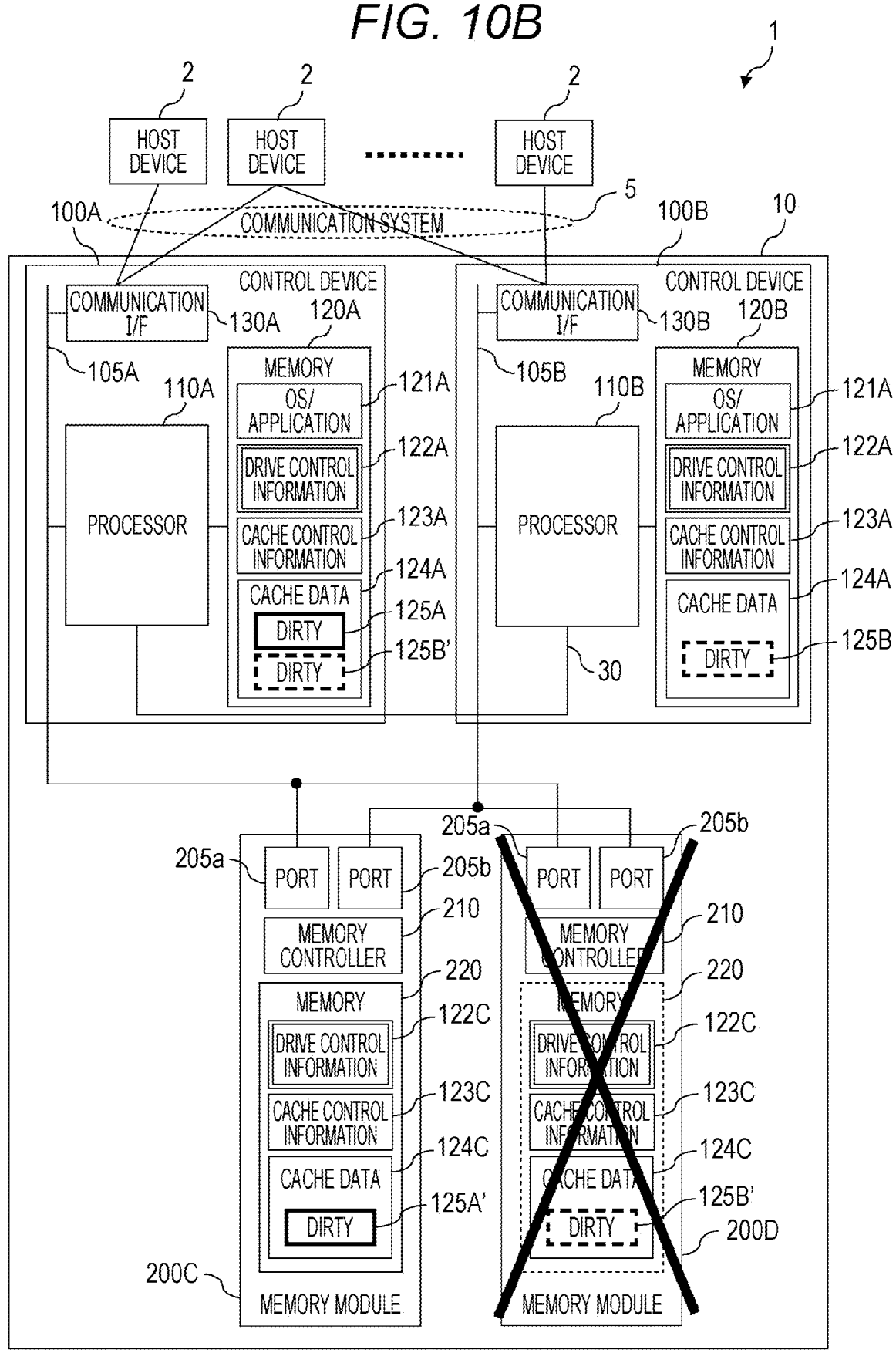
FIG. 10B is a diagram explaining an operation of the storage apparatus in a case where a memory module is blocked.

As illustrated in FIG. 10B, in a case where the memory module 200D is blocked, the dirty data 125B in the memory 120B is stored as the dirty data 125B' in the memory 120A of the control device 100A, and thus the redundancy of the dirty data 125B is secured even after the memory module 200D is blocked. In this case, the control device 100A may acquire the dirty data 125B from the control device 100B via the internal bus 30, or may acquire the dirty data from the memory 220D of the memory module 200D via the control device 100B by using the function of NTB or CXL. Note that the redundancy of the dirty data 125B can also be secured by a mechanism similar to the above in a case where the memory module 200C is blocked.

In the storage apparatus 10 according to the second embodiment, in the normal state, the control device 100A can access the dirty data 125A' in the memory 220C of the memory module 200C at high speed, and the control device 100B can access the dirty data 125B' in the memory 220D of the memory module 200D at high speed. Therefore, the performance of the storage apparatus 10 can be enhanced. Further, even in a case where the control device 100 shifts to the power saving mode or the memory module 200 is blocked, redundancy of the dirty data 125 (the dirty data 125A and the dirty data 125B) is maintained, and data reliability and availability can be secured.

Third Embodiment

Figure 11:
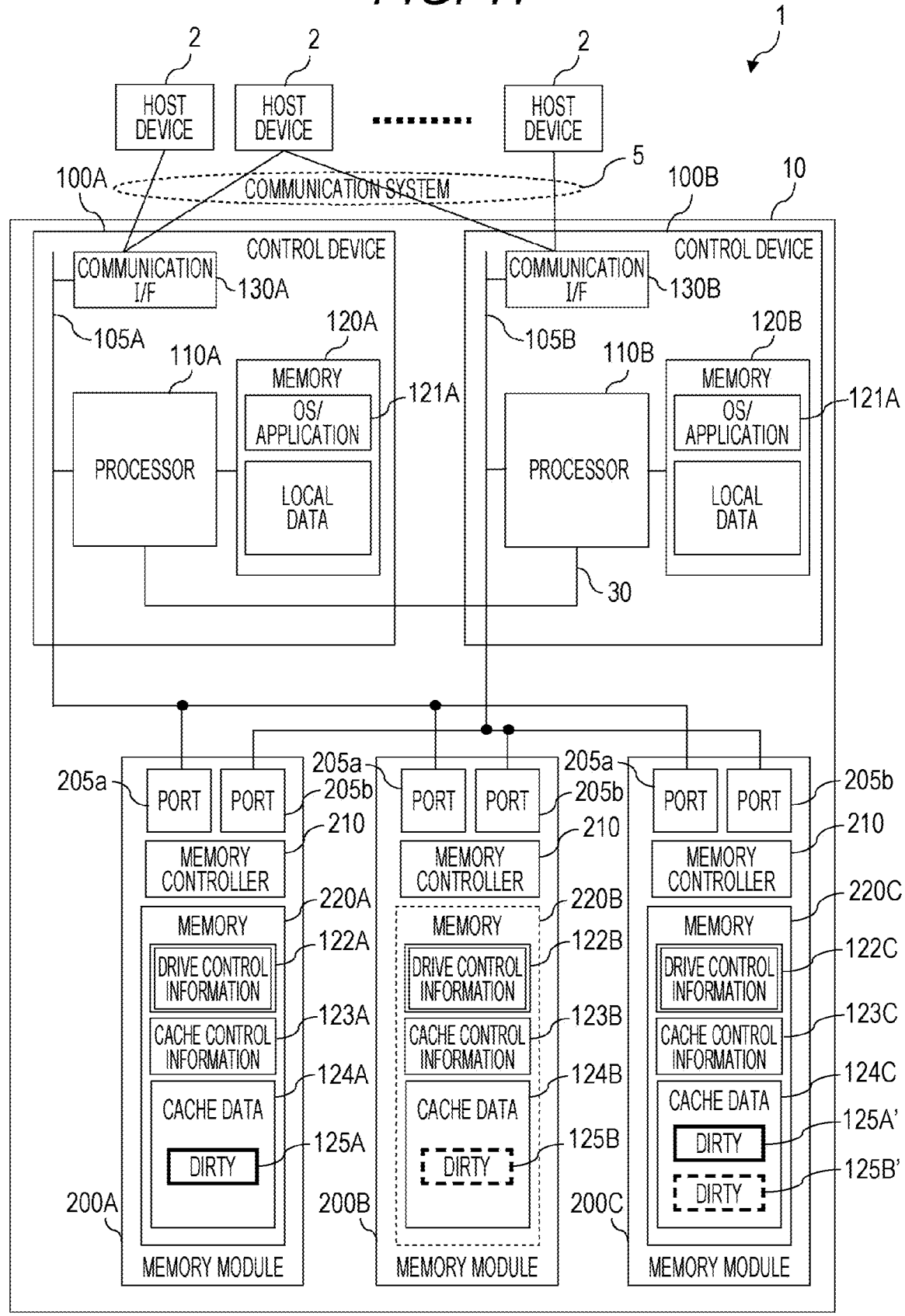
FIG. 11 is a diagram illustrating a schematic configuration of a storage system according to a third embodiment.

FIG. 11 illustrates a configuration of a storage system 1 according to a third embodiment. The storage system 1 illustrated in the drawing is different in configuration from the storage system 1 illustrated in FIG. 3 as to the following points:

(1) The storage apparatus 10 includes three memory modules 200A, 200B, and 200C.
(2) In FIG. 3, the drive control information 122A, the cache control information 123A, and the cache data 124A stored in the memory 120A of the control device 100A are stored in the memory 220A of the memory module 200A.
(3) In FIG. 3, the drive control information 122B, the cache control information 123B, and the cache data 124B stored in the memory 120B of the control device 100B are stored in the memory 220B of the memory module 200B.
(4) The dirty data 125A' having the same content as the dirty data 125A of the memory 220A and the dirty data 125B' having the same content as the dirty data 125B in the memory 220B are stored in the memory 220C of the memory module 200C.

In the exemplified storage apparatus 10, in a case where any memory module 200 is blocked, the dirty data 125 is stored in each of the other two memory modules 200 so that the redundancy of the dirty data 125 (the dirty data 125A and the dirty data 125B) is maintained in the other two memory modules 200. The transfer (sharing) of the dirty data 125 between the memory modules in this case may be performed by the control device 100 (the control device 100A and the control device 100B) directly accessing the memory 220 via the I/O bus 105 (the I/O bus 105A and the I/O bus 105B) or by indirectly accessing the memory 220 via another control device 100 using the function of NTB or CXL.

The storage system 1 according to the third embodiment, similarly to the case of the storage system 1 according to the first embodiment, makes it is possible to secure data reliability and availability while maintaining the performance of the storage apparatus 10. In addition, since the drive control information 122, the cache control information 123, and the cache data 124 are not stored in the memory 120A of the control device 100A or the memory 120B of the control device 100B, the capacity of the memory 120 of the control device 100 can be reduced. Further, since these pieces of information are not placed in the memory 120 of the control device 100, the load on the control device 100 is reduced, and the possibility that a failure occurs in the control device 100 can be reduced.

Although the embodiments of the present invention have been described above, the present invention is not limited to the above-described embodiments, and includes various modifications. Moreover, the present invention is not necessarily limited to that which has all of the configurations described above.

For example, the present invention can also be applied to a storage system of a type different from the storage systems 1 described in the first to third embodiments as long as the storage system is configured using a storage apparatus in which a control device is redundant and a memory module can be mounted. An example of a different type of the storage system includes a storage system using a storage apparatus (for example, an enterprise type storage apparatus) that is configured to includes a plurality of control devices (channel adapters) functioning as communication adapters and a plurality of drive adapters functioning as drive control devices. These devices and adapters are connected by a switch such as a high-speed crossbar switch.

What is claimed is:

1. A storage apparatus communicably connected to another apparatus and performing data input-output (I/O) processing in a storage device in response to a data I/O request received from the another apparatus, the storage apparatus comprising:

two control devices including a first control device and a second control device communicably connected to each other; and three memories including a first memory, a second memory, and a third memory capable of being directly or indirectly accessed by the two control devices, wherein the first memory stores drive control information that is information for managing association between a logical address and a physical address, the logical address being information indicating a location of data treated by the another apparatus in the data I/O processing, the physical address being information indicating a location of the data in the storage device, first cache data in the data I/O processing, and first cache control information that is information for managing association between the logical address of the first cache data and a cache address that is information indicating a location of the first cache data in the first memory, wherein the second memory stores the drive control information, second cache data in the data I/O processing, and second cache control information that is information for managing association between the logical address of the second cache data and a cache address that is information indicating a location of the second cache data in the first memory, wherein the third memory stores the drive control information, first dirty data that is dirty data of the first cache data, second dirty data that is dirty data of the second cache data, and third cache control information for managing association between the logical address of the first dirty data or the second dirty data and a cache address that is information indicating a location of the first dirty data or the second dirty data in the third memory, wherein the data I/O processing is performed while the first dirty data and the second dirty data are redundantly stored in the three memories, wherein the first dirty data and the second dirty data are, for stopping a function of any one of the three memories, transferred among the three memories, and thus the first dirty data and the second dirty data are redundantly stored in two of the three memories other than the any one memory that is stopped for stopping a function of any one of the three memories, and wherein after the any one memory is stopped, the data I/O processing is performed while the first dirty data and the second dirty data are redundantly stored respectively in the two of the three memories other than the any one memory that is stopped.

2. The storage apparatus according to claim 1, wherein the first cache data is data stored in the storage device in the data I/O processing by the first control device, wherein the second cache data is data stored in the storage device in the data I/O processing by the second control device, wherein the first control device is set to be capable of directly accessing the third memory, wherein the second control device is set to be capable of indirectly accessing the third memory via the first control device, wherein the first control device, for stopping of a function of the second memory, directly accesses the third memory to acquire the second dirty data and store the acquired second dirty data as the first cache data in the first memory, and wherein after the function of the second memory is stopped, the data I/O processing is performed while the first dirty data and the second dirty data are redundantly stored in the first memory and the third memory, respectively.

3. The storage apparatus according to claim 1, wherein the first cache data is data stored in the storage device in the data I/O processing by the first control device, wherein the second cache data is data stored in the storage device in the data I/O processing by the second control device, wherein the first control device is set to be capable of directly accessing the third memory, wherein the second control device is set to be capable of indirectly accessing the third memory via the first control device, wherein, for stopping the function of the first memory, the second control device indirectly accesses the third memory via the first control device to acquire the first dirty data and to store the acquired first dirty data as the second cache data in the second memory, and is reset to be capable of directly accessing the third memory, and wherein, after the function of the first memory is stopped, the data I/O processing is performed while the first dirty data and the second dirty data are redundantly stored respectively in the second memory and the third memory.

4. The storage apparatus according to claim 1, wherein the first cache data is data stored in the storage device in the data I/O processing by the first control device, wherein the second cache data is data stored in the storage device in the data I/O processing by the second control device, wherein, for stopping a function of the third memory, the first control device communicates with the second control device to acquire the second dirty data in the second memory and to store the acquired second dirty data as the first cache data in the first memory, and the second control device communicates with the first control device to acquire the first dirty data in the first memory and to store the acquired first dirty data as the second cache data in the second memory, and wherein after the function of the third memory is stopped, the data I/O processing is performed while the first dirty data and the second dirty data are redundantly stored in the first memory and the second memory, respectively.

5. The storage apparatus according to claim 1, further comprising a plurality of memory modules that provides the plurality of memories, respectively, wherein the first dirty data is stored in the third memory provided by a first memory module among the plurality of memory modules, and wherein the second dirty data is stored in the third memory provided by a second memory module among the plurality of memory modules.

6. The storage apparatus according to claim 1, further comprising a plurality of memory modules including a first memory module, a second memory module, and a third memory module that provide the three memories, respectively, wherein the first dirty data is stored in the first memory provided by the first memory module, wherein the second dirty data is stored in the second memory provided by the second memory module, and wherein the first dirty data and the second dirty data are stored in the third memory provided by the third memory module.

7. The storage apparatus according to claim 1, wherein the stop of the function of the any one memory occurs when any one control device of the two control devices shifts to a power saving mode, or the any one control device or the any one memory is blocked.

8. The storage apparatus according to claim 1, wherein the two control devices each include a processor, the memory, a communication interface that communicates with the another control device, and a drive interface that communicates with the storage device.

9. The storage apparatus according to claim 1, wherein the two control devices each indirectly access the three memories using a function of a Non Transparent Bridge (NTB) or a Compute Express Link (CXL).

10. A control method for a storage apparatus communicably connected to another apparatus, the storage apparatus performing data input-output (I/O) processing in a storage device in response to a data I/O request received from the another apparatus, the storage apparatus including two control devices including a first control device and a second control device communicably connected to each other, and three memories including a first memory, a second memory, and a third memory capable of being directly or indirectly accessed by the two control devices, the first memory storing drive control information that is information for managing association between a logical address and a physical address, the logical address being information indicating a location of data treated by the another apparatus in the data I/O processing, the physical address being information indicating a location of the data in the storage device, first cache data in the data I/O processing, and first cache control information that is information for managing association between the logical address of the first cache data and a cache address that is information indicating a location of the first cache data in the first memory, the second memory storing the drive control information, second cache data in the data I/O processing, and second cache control information that is information for managing association between the logical address of the second cache data and a cache address that is information indicating a location of the second cache data in the first memory, the third memory storing the drive control information, first dirty data that is dirty data of the first cache data, second dirty data that is dirty data of the second cache data, and third cache control information for managing association between the logical address of the first dirty data or the second dirty data and a cache address that is information indicating a location of the first dirty data or the second dirty data in the third memory, the control method causing the storage apparatus to:

perform the data I/O processing while redundantly storing the first dirty data and the second dirty data in the three memories;

transfer, when a function of any one of the three memories is stopped, the first dirty data and the second dirty data among the three memories to redundantly store the first dirty data and the second dirty data respectively in two of the three memories other than the any one memory that is stopped; and perform, after stopping the any one memory, the data I/O processing while redundantly storing the first dirty data and the second dirty data respectively in the two memories.

11. The control method for the storage apparatus according to claim 10, wherein the first cache data is data stored in the storage device in the data I/O processing by the first control device, wherein the second cache data is data stored in the storage device in the data I/O processing by the second control device, wherein the first control device is set to be capable of directly accessing the third memory, and wherein the second control device is set to be capable of indirectly accessing the third memory via the first control device, the control method further causing the storage apparatus to:

cause the first control device to directly access the third memory to acquire the second dirty data and store the acquired second dirty data as the first cache data in the first memory for stopping a function of the second memory; and perform, after the function of the second memory is stopped, the data I/O processing while redundantly storing the first dirty data and the second dirty data respectively in the first memory and the third memory.

12. The control method for the storage apparatus according to claim 10, wherein the first cache data is data stored in the storage device in the data I/O processing by the first control device, wherein the second cache data is data stored in the storage device in the data I/O processing by the second control device, wherein the first control device is set to be capable of directly accessing the third memory, and wherein the second control device is set to be capable of indirectly accessing the third memory via the first control device, the control method further causing the storage apparatus to:

for stopping the function of the first memory, cause the second control device to indirectly access the third memory via the first control device to acquire the first dirty data and store the acquired first dirty data as the second cache data in the second memory, and reset to be capable of directly accessing the third memory; and perform, after the function of the first memory is stopped, the data I/O processing while redundantly storing the first dirty data and the second dirty data respectively in the second memory and the third memory.

13. The control method for the storage apparatus according to claim 10, wherein the first cache data is data stored in the storage device in the data I/O processing by the first control device, and wherein the second cache data is data stored in the storage device in the data I/O processing by the second control device, the control method further causing the storage apparatus to:
for stopping the function of the third memory, cause the first control device to communicate with the second control device to acquire the second dirty data in the second memory and store the acquired second dirty data as the first cache data in the first memory, and cause the second control device to communicate with the first control device to acquire the first dirty data in the first memory and store the acquired first dirty data as the second cache data in the second memory; and
perform, after the function of the third memory is stopped, the data I/O processing while redundantly storing the first dirty data and the second dirty data respectively in the first memory and the second memory.

14. The control method for the storage apparatus according to claim 10,
wherein the storage apparatus includes a plurality of memory modules including a first memory module and a second memory module that provide the three memories,
the control method further comprising:
storing the first dirty data in the third memory provided by the first memory module; and
storing the second dirty data in the third memory provided by the second memory module.

15. The control method for the storage apparatus according to claim 10,
wherein the storage apparatus includes a plurality of memory modules including a first memory module, a second memory module, and a third memory module that respectively provide the three memories,
the control method further comprising:
storing the first dirty data in the first memory provided by the first memory module;
storing the second dirty data in the second memory provided by the second memory module; and
storing the first dirty data and the second dirty data in the third memory provided by the third memory module.

* * * * *